United States Patent
Ishimura

(10) Patent No.: US 10,963,919 B2
(45) Date of Patent: Mar. 30, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Takanari Ishimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 61 days.

(21) Appl. No.: 16/034,641

(22) Filed: Jul. 13, 2018

(65) Prior Publication Data
US 2019/0034969 A1    Jan. 31, 2019

(30) Foreign Application Priority Data
Jul. 28, 2017 (JP) .............................. JP2017-146070

(51) Int. Cl.
| | |
|---|---|
| G06Q 30/00 | (2012.01) |
| G06Q 30/02 | (2012.01) |
| H04W 4/23 | (2018.01) |
| H04W 4/20 | (2018.01) |
| H04L 29/08 | (2006.01) |

(Continued)

(52) U.S. Cl.
CPC ..... *G06Q 30/0267* (2013.01); *H04L 67/2828* (2013.01); *H04W 4/20* (2013.01); *H04W 4/23* (2018.02); *H04L 67/20* (2013.01); *H04W 4/80* (2018.02); *H04W 84/12* (2013.01)

(58) Field of Classification Search
CPC . G06Q 30/0267; H04L 67/2828; H04L 67/20; H04W 4/20; H04W 4/23; H04W 4/80; H04W 84/12; H04W 88/005

USPC ................... 705/14.49, 14.67, 14.72, 14.73
See application file for complete search history.

(56) References Cited

U.S. PATENT DOCUMENTS 6,216,228 B1 *  4/2001  Chapman ............... G06T 1/0021
                                                 348/E7.061
6,763,122 B1 *  7/2004  Rodriguez ............ G06T 1/0028
                                                 358/3.28

(Continued)

FOREIGN PATENT DOCUMENTS

| JP | 2011-077597 A | 4/2011 |
|---|---|---|
| JP | 2012-079166 A | 4/2012 |

(Continued)

OTHER PUBLICATIONS

Curran, Kevin, et al. "Transcoding Media for Bandwidth Constrained Mobile Devices." International Journal of Network Management ., vol. 15, Jan. 2005, pp. 75-88. (Year: 2005).*

(Continued)

*Primary Examiner* — Luis A Brown
(74) *Attorney, Agent, or Firm* — Oliff PLC

(57) ABSTRACT

An information processing apparatus includes a transmitting unit, a receiving unit, and a converting unit. The transmitting unit transmits advertisement information to an apparatus provided for presenting an advertisement. The receiving unit receives operation information from the apparatus. The converting unit performs conversion after the receiving unit receives the operation information, the conversion leading to reduction of an amount of the advertisement information. The transmitting unit transmits, to the apparatus, the advertisement information having undergone the conversion performed by the converting unit.

7 Claims, 14 Drawing Sheets

(51) Int. Cl.
*H04W 84/12* (2009.01)
*H04W 4/80* (2018.01)

(56) References Cited

U.S. PATENT DOCUMENTS

| | | | | |
|---|---|---|---|---|
| 6,866,196 | B1* | 3/2005 | Rathus | B42D 3/123 235/462.15 |
| 6,947,571 | B1* | 9/2005 | Rhoads | G06Q 30/02 382/100 |
| 7,050,603 | B2* | 5/2006 | Rhoads | G11B 20/00086 382/100 |
| 7,123,740 | B2* | 10/2006 | McKinley | G06F 21/125 382/100 |
| 7,184,572 | B2* | 2/2007 | Rhoads | G01C 11/00 382/100 |
| 7,254,249 | B2* | 8/2007 | Rhoads | G01C 11/00 382/100 |
| 7,395,432 | B2* | 7/2008 | Lee | G06T 1/005 375/E7.089 |
| 7,397,607 | B2* | 7/2008 | Travers | G02B 27/0172 359/629 |
| 7,506,169 | B2* | 3/2009 | Brundage | G06F 21/6209 380/258 |
| 8,121,342 | B2* | 2/2012 | Davis | G06T 1/0021 382/100 |
| 8,135,166 | B2* | 3/2012 | Rhoads | G06F 16/29 382/100 |
| 8,312,162 | B2* | 11/2012 | Honma | H04N 21/44004 709/231 |
| 8,606,645 | B1* | 12/2013 | Applefeld | G06Q 30/02 705/26.1 |
| 9,449,342 | B2* | 9/2016 | Sacco | G06Q 30/0643 |
| 2002/0090111 | A1* | 7/2002 | Fukushima | G06T 1/0028 382/100 |
| 2002/0147910 | A1* | 10/2002 | Brundage | H04N 1/32144 713/176 |
| 2002/0188841 | A1* | 12/2002 | Jones | G06K 9/00442 713/153 |
| 2004/0158724 | A1* | 8/2004 | Carr | B42D 25/333 713/186 |
| 2005/0169499 | A1* | 8/2005 | Rodriguez | H04N 1/32144 382/100 |
| 2005/0195128 | A1* | 9/2005 | Sefton | A63B 71/0622 345/7 |
| 2005/0213790 | A1* | 9/2005 | Rhoads | G07F 17/26 382/100 |
| 2005/0276440 | A1* | 12/2005 | Rhoads | G06T 1/0021 382/100 |
| 2006/0133645 | A1* | 6/2006 | Rhoads | G06F 16/955 382/100 |
| 2006/0285532 | A1* | 12/2006 | Radziewicz | H04M 3/42153 370/352 |
| 2007/0003223 | A1* | 1/2007 | Armstrong | G11B 27/34 386/217 |
| 2007/0242853 | A1* | 10/2007 | Rodriguez | G06T 1/0064 382/100 |
| 2007/0274561 | A1* | 11/2007 | Rhoads | G06F 16/9554 382/100 |
| 2008/0025561 | A1* | 1/2008 | Rhoads | G06T 1/0021 382/100 |
| 2008/0080737 | A1* | 4/2008 | Rhoads | G06F 16/29 382/100 |
| 2008/0089550 | A1* | 4/2008 | Brundage | G09B 29/106 382/100 |
| 2008/0123154 | A1* | 5/2008 | Brundage | G09B 29/106 358/3.28 |
| 2008/0172458 | A1* | 7/2008 | Middleton | H04L 67/18 709/203 |
| 2009/0088243 | A1* | 4/2009 | Gagner | G07F 17/322 463/25 |
| 2009/0136081 | A1* | 5/2009 | Mamidwar | H04N 21/6581 382/100 |
| 2009/0230188 | A1* | 9/2009 | Wang | G06Q 10/087 235/385 |
| 2010/0013951 | A1* | 1/2010 | Rodriguez | G06T 1/0028 348/222.1 |
| 2010/0048242 | A1* | 2/2010 | Rhoads | G06F 16/50 455/556.1 |
| 2010/0069158 | A1* | 3/2010 | Kim | A63F 13/323 463/42 |
| 2010/0070565 | A1* | 3/2010 | Leblanc | G06F 16/958 709/203 |
| 2010/0119208 | A1* | 5/2010 | Davis | H04H 60/61 386/291 |
| 2010/0211431 | A1* | 8/2010 | Lutnick | G06Q 50/34 705/14.12 |
| 2010/0228632 | A1* | 9/2010 | Rodriguez | G06F 3/0425 705/14.66 |
| 2010/0257252 | A1* | 10/2010 | Dougherty | G06K 9/00671 709/217 |
| 2011/0017826 | A1* | 1/2011 | Mohan | G06K 7/10831 235/462.11 |
| 2011/0258668 | A1* | 10/2011 | Musa | H04N 21/44222 725/61 |
| 2012/0184352 | A1* | 7/2012 | Detlefsen | G07F 17/3225 463/25 |
| 2012/0224851 | A1* | 9/2012 | Takara | H04J 14/0221 398/45 |
| 2012/0258776 | A1* | 10/2012 | Lord | H04N 1/00307 455/556.1 |
| 2012/0310726 | A1* | 12/2012 | Levy | H04N 1/32144 705/14.34 |
| 2013/0010103 | A1* | 1/2013 | Ihara | B63B 43/18 348/116 |
| 2014/0098132 | A1* | 4/2014 | Fein | G06T 19/006 345/633 |
| 2014/0100996 | A1* | 4/2014 | Klein | G06T 1/00 705/27.2 |
| 2015/0029196 | A1 | 1/2015 | Shida et al. | |
| 2015/0192999 | A1* | 7/2015 | Chirakan | G06F 3/017 705/26.81 |
| 2016/0044249 | A1* | 2/2016 | Syu | H04N 5/2258 348/159 |
| 2016/0253745 | A1* | 9/2016 | Lee | G06T 19/006 705/27.2 |
| 2016/0366334 | A1* | 12/2016 | Kim | H04N 5/23245 |
| 2017/0086211 | A1* | 3/2017 | Sahin | H04W 48/16 |
| 2017/0094368 | A1 | 3/2017 | Kakei | |
| 2017/0149856 | A1* | 5/2017 | Liu | H04N 21/2381 |
| 2017/0187669 | A1* | 6/2017 | Do | H04L 51/32 |
| 2018/0150931 | A1* | 5/2018 | Wagner | G06T 19/006 |
| 2018/0195881 | A1* | 7/2018 | Acker | G01R 27/2611 |
| 2018/0260843 | A1* | 9/2018 | Hiranandani | G06Q 30/0255 |
| 2018/0314888 | A1* | 11/2018 | Koul | G06T 7/70 |

FOREIGN PATENT DOCUMENTS

| | | |
|---|---|---|
| JP | 2013-066045 A | 4/2013 |
| JP | 2013-161360 A | 8/2013 |
| JP | 2015-089099 A | 5/2015 |
| JP | 2017-068683 A | 4/2017 |

OTHER PUBLICATIONS

Feb. 2, 2021 Office Action issued in Japanese Patent Application No. 2017-146070.

* cited by examiner

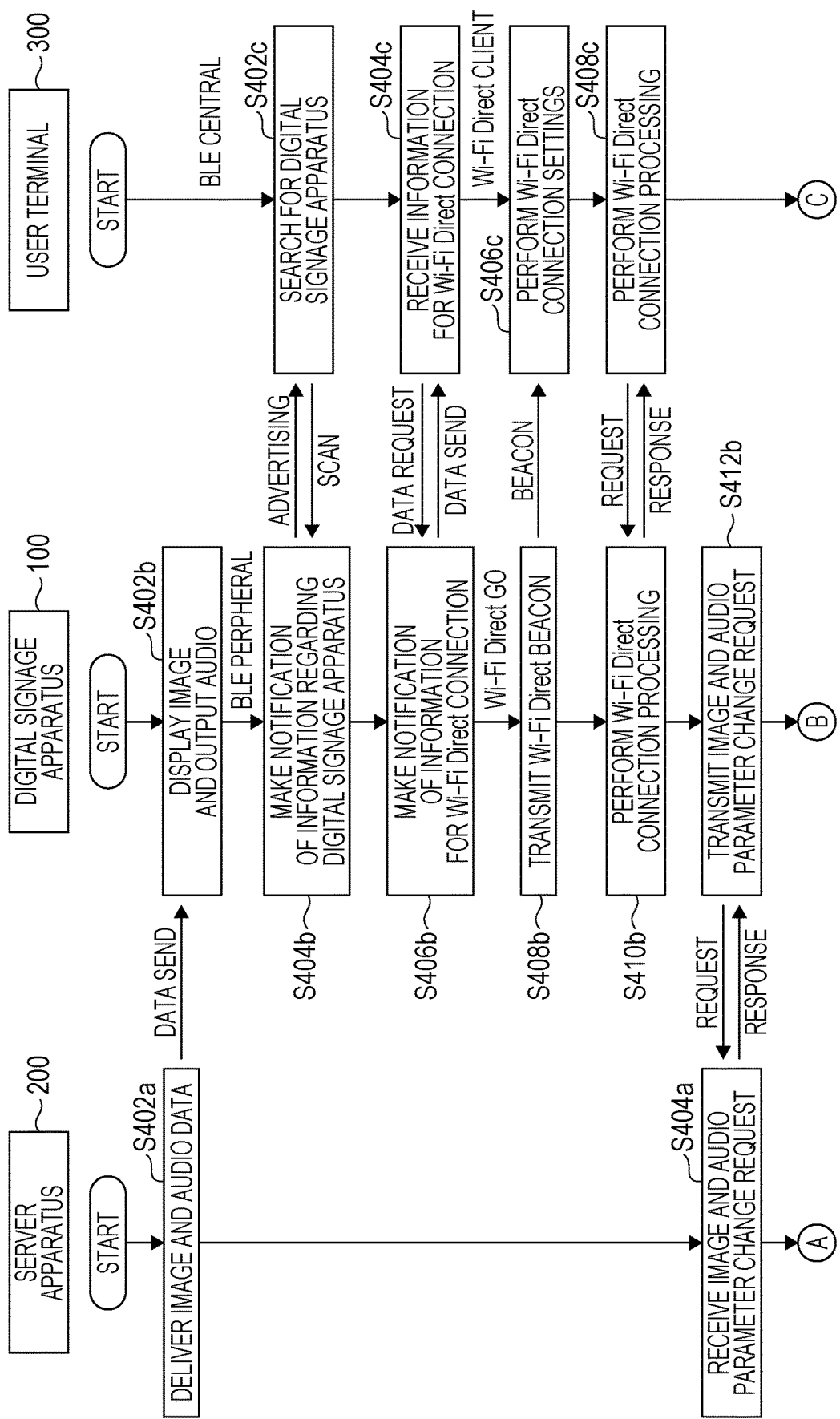

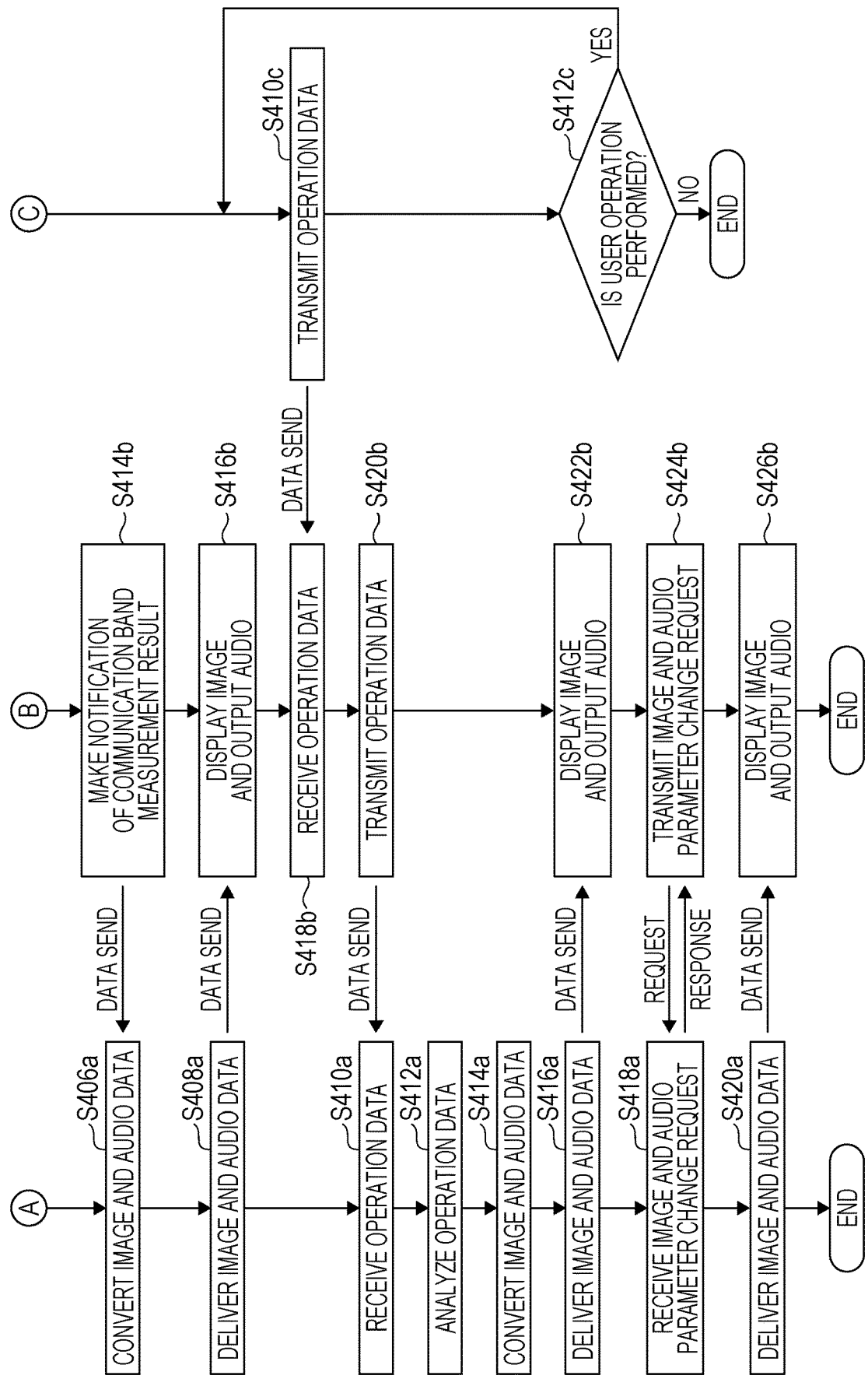

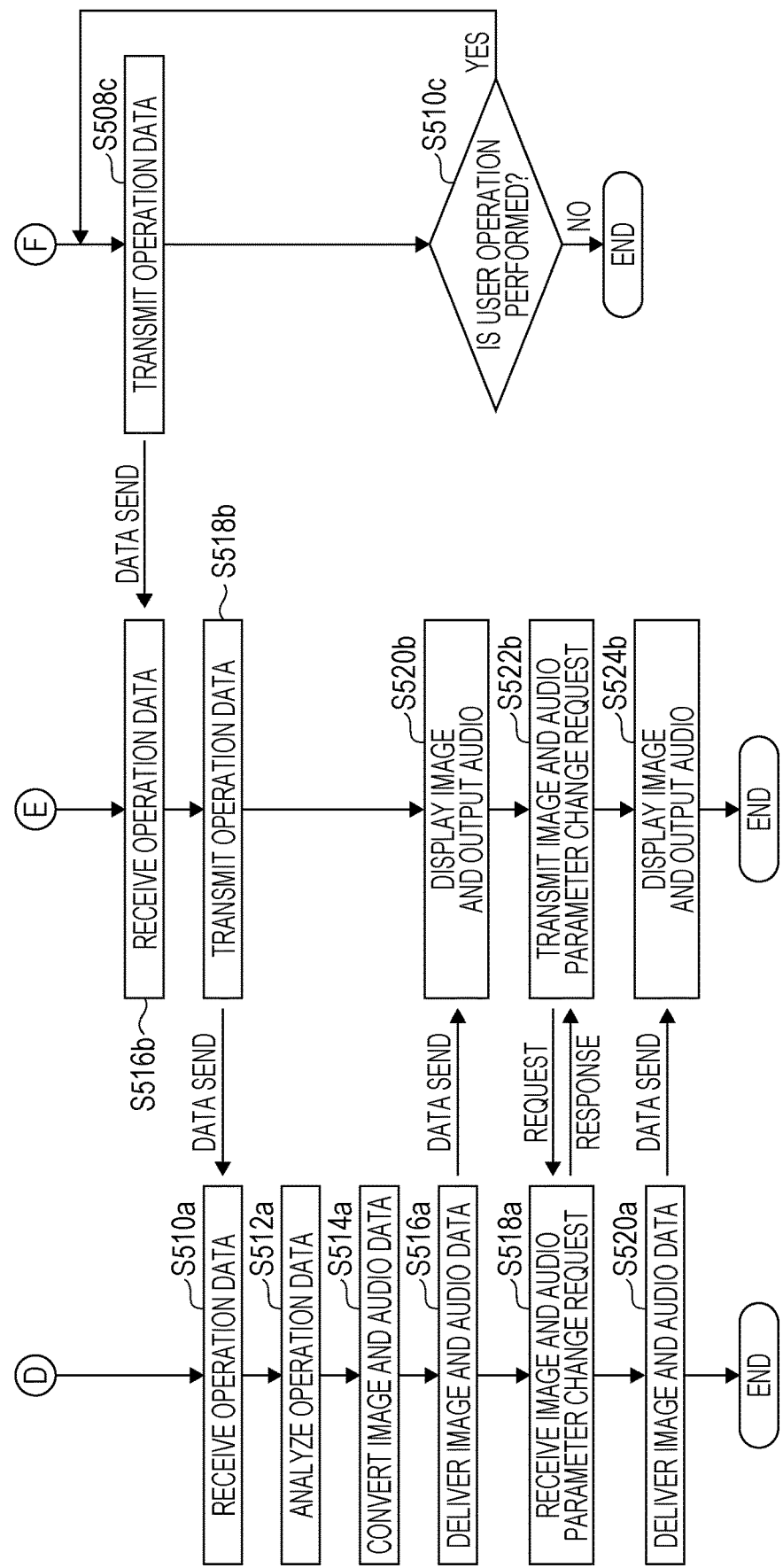

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-146070 filed Jul. 28, 2017.

BACKGROUND

(i) Technical Field

The present invention relates to an information processing apparatus and a non-transitory computer readable medium.

(ii) Related Art

In a case where advertisement information is transmitted to an apparatus for presenting advertisements, an operation for an advertisement is performed in some cases. In addition, there is a technology in which the same amount of advertisement information is transmitted regardless of whether an operation is performed. If such a technology is used, a time lag between presenting the advertisement and performing the operation occurs in some cases.

SUMMARY

According to an aspect of the invention, there is provided an information processing apparatus including a transmitting unit, a receiving unit, and a converting unit. The transmitting unit transmits advertisement information to an apparatus provided for presenting an advertisement. The receiving unit receives operation information from the apparatus. The converting unit performs conversion after the receiving unit receives the operation information, the conversion leading to reduction of an amount of the advertisement information. The transmitting unit transmits, to the apparatus, the advertisement information having undergone the conversion performed by the converting unit.

BRIEF DESCRIPTION OF THE DRAWINGS

Exemplary embodiments of the present invention will be described in detail based on the following figures, wherein:

FIGS. 4A and 4B are flowcharts illustrating example processing performed by the first exemplary embodiment;

FIGS. 5A and 5B are flowcharts illustrating different example processing performed by the first exemplary embodiment;

DETAILED DESCRIPTION

Before exemplary embodiments are described, a premise for the exemplary embodiments and an information processing apparatus using the exemplary embodiments will be described. Note that the description is provided for easy understanding of the exemplary embodiments and is not intended to be used to limit interpretation of the exemplary embodiments. It is natural that whether an invention for which a patent is sought corresponds to description in the detailed description (Patent Act Article 36(6) (i)) shall not be determined based on only the description.

In the exemplary embodiments, a path for receiving image and audio data and a path for receiving operation data from a user terminal are made different. This reduces the overhead of a digital signage apparatus at the time of performing two-way operations and thus stabilizes operations of a system. When the system enters a two-way operation mode, the communication band of the image and audio data is automatically lowered, and the communication band of operation data is thus ensured. A difference (time lag) between displaying of the content of a moving image and an operation is thereby eliminated.

Hereinafter, examples of various exemplary embodiments to implement the present invention will be described on the basis of the drawings.

Figure 1:
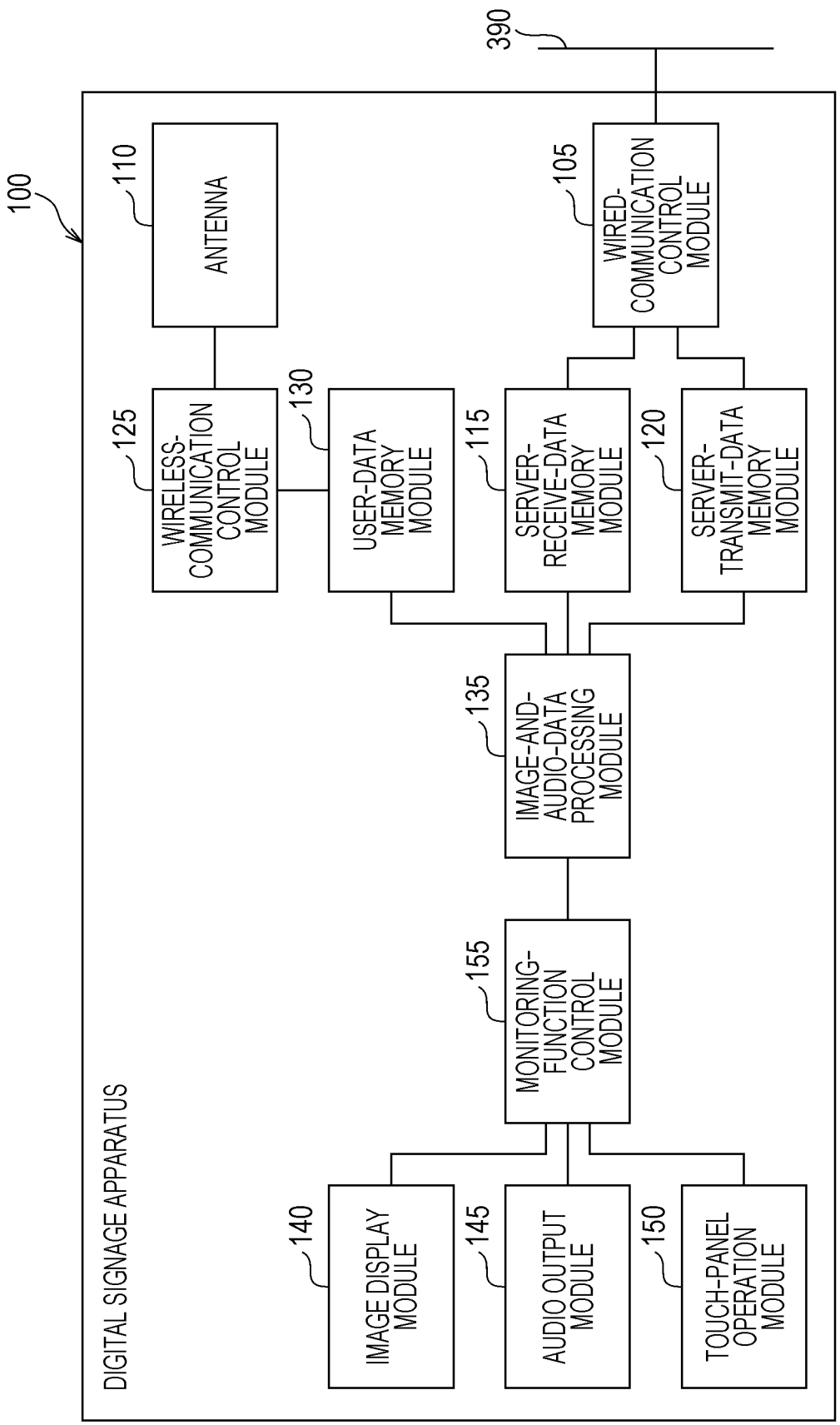
FIG. 1 is a conceptual module configuration diagram of an example configuration of a first exemplary embodiment (a digital signage apparatus)

FIG. 1 is a conceptual module configuration diagram of an example configuration of a first exemplary embodiment (a digital signage apparatus 100).

Note that the term "module" refers to generally logically separable components of software (computer programs) and hardware or the like. Modules in each exemplary embodiment thus refer to not only modules in a computer program but also modules in a hardware configuration. Accordingly, the description of the exemplary embodiment also serves as a description of a computer program for causing a computer to function as the modules (a program for causing a computer to execute steps, a program for causing a computer to function as components, and a program for causing a computer to implement functions) as well as a system and a method therefor. Meanwhile, the term "to store" and other terms equivalent to "to store" are used in descriptions. In a case where the exemplary embodiment describes a computer program, the term means storing something in a storage device or controlling something so as to store something in a storage device. The modules are provided for respective functions on a one-to-one basis. However, in implementing the functions, one program may constitute one module; one program may constitute multiple modules; and multiple programs may constitute one module. In addition, one computer may run multiple modules, and multiple computers may run one module in a distributed or parallel processing environment. Note that one module may include another module. Moreover, the term "connection" is used for not only a physical connection but also a logical connection (such as data exchange, instructions, or a reference relationship among data items). The term "predetermined" refers to having been determined before target processing. This term is used in such a manner as to include the meaning of being determined according to the situation at the determination time or to the situation thus far only before target processing, regardless of whether before or even after the start of processing in the exemplary embodiment. Meanwhile, in a case of multiple "predetermined values", the values may be different from one another, or two or more of the values may be the same (including all of the values). Moreover, an expression meaning "if A, then B" is used in such a manner as to mean that "it is determined whether A holds true, and if it is determined that A holds true, then B is performed". However, this excludes a case where the determination of whether A holds true is not needed. In addition, listing things such as "A, B, and C" is illustrative listing unless otherwise stated and includes selecting only one of the listed things (for example, only A).

A system, a device, or an apparatus includes not only a configuration in which multiple computers, hardware, apparatuses, and the like are connected to each other through a communication unit such as a network (including a communication connection on a one-to-one basis), but also a configuration in which a computer, hardware, an apparatus, or the like is implemented. The terms "device", "apparatus", and "system" are used as terms having the same meaning. It goes without saying that the "system" does not include a mere social "system" built in accordance with agreements worked out by humans.

In addition, to perform a processing operation or multiple processing operations in each module, the module reads target information from a storage device for each processing, performs the processing, and writes a processing result to the storage device. Accordingly, explanations of reading the content from the storage device before processing and writing the content to the storage device after the processing are omitted in some cases. Here, the storage device may include a hard disk, a random access memory (RAM), an external storage medium, a storage device connected through a communication network, a register in a central processing unit (CPU), and other devices.

The digital signage apparatus 100 that is the first exemplary embodiment presents advertisements and includes, as illustrated in the example in FIG. 1, a wired-communication control module 105, an antenna 110, a server-receive-data memory module 115, a server-transmit-data memory module 120, a wireless-communication control module 125, a user-data memory module 130, an image-and-audio-data processing module 135, an image display module 140, an audio output module 145, a touch-panel operation module 150, and a monitoring-function control module 155.

The digital signage apparatus 100 is capable of wirelessly communicating with a user terminal 300 and is also capable of communicating with a server apparatus 200 via a (wired) communication network 390. For the wireless communication with the user terminal 300, IEEE 802.11ad may be used.

The wired-communication control module 105 is connected to the server-receive-data memory module 115 and the server-transmit-data memory module 120 and is also connected to the (wired) communication network 390. The wired-communication control module 105 communicates with the server apparatus 200 via the (wired) communication network 390 (such as Ethernet).

The server-receive-data memory module 115 is connected to the wired-communication control module 105 and the image-and-audio-data processing module 135. The server-receive-data memory module 115 stores therein data (advertisement information received from the server apparatus 200) received by the wired-communication control module 105. Note that advertisement information includes image information indicating the content of an advertisement (including still image information and moving image information), audio information, and combined these pieces of information.

The server-transmit-data memory module 120 is connected to the wired-communication control module 105 and the image-and-audio-data processing module 135. The server-transmit-data memory module 120 stores therein data to be transmitted to the server apparatus 200 by the wired-communication control module 105. Specifically, the server-transmit-data memory module 120 stores therein operation information transmitted from the user terminal 300 (operation information that is data stored in the user-data memory module 130 and that is received from the user terminal 300).

The antenna 110 is connected to the wireless-communication control module 125. The antenna 110 is a device for wirelessly communicating with the user terminal 300. The antenna 110 may be capable of using IEEE 802.11ad.

The wireless-communication control module 125 is connected to the antenna 110 and the user-data memory module 130. The wireless-communication control module 125 controls wireless communication with the user terminal 300 by using the antenna 110. Specifically, the wireless-communication control module 125 receives the operation information from the user terminal 300 and transmits, to the user terminal 300, a reply from the server apparatus 200 in response to the operation information.

The user-data memory module 130 is connected to the wireless-communication control module 125 and the image-and-audio-data processing module 135. The user-data memory module 130 stores therein data received by the wireless-communication control module 125 from the user terminal 300. The stored data corresponds to, for example, operation information indicating an operation for searching for an advertisement intended to be seen by a user, designating an advertisement, or the like.

The image-and-audio-data processing module 135 is connected to the server-receive-data memory module 115, the server-transmit-data memory module 120, the user-data memory module 130, and the monitoring-function control module 155. The image-and-audio-data processing module 135 performs processing of conversion, to data that may be output, from data for image display and data for audio output that are advertisement information.

The monitoring-function control module 155 is connected to the image-and-audio-data processing module 135, the image display module 140, the audio output module 145, and the touch-panel operation module 150. The monitoring-function control module 155 controls the image display module 140, the audio output module 145, and the touch-panel operation module 150 and presents advertisement information processed by the image-and-audio-data processing module 135.

The image display module 140 is connected to the monitoring-function control module 155. The image display module 140 is a display device such as a liquid crystal display and displays an image that is advertisement information, a moving image, and the like under the control of the monitoring-function control module 155.

The audio output module 145 is connected to the monitoring-function control module 155. The audio output module 145 is an audio output device such as a speaker and outputs audio information that is advertisement information under the control of the monitoring-function control module 155.

The touch-panel operation module 150 is connected to the monitoring-function control module 155. The touch-panel operation module 150 is a touch panel or the like. The touch-panel operation module 150 receives a user operation (operation information) and delivers the operation information to the monitoring-function control module 155 (and to the user-data memory module 130).

Figure 2:
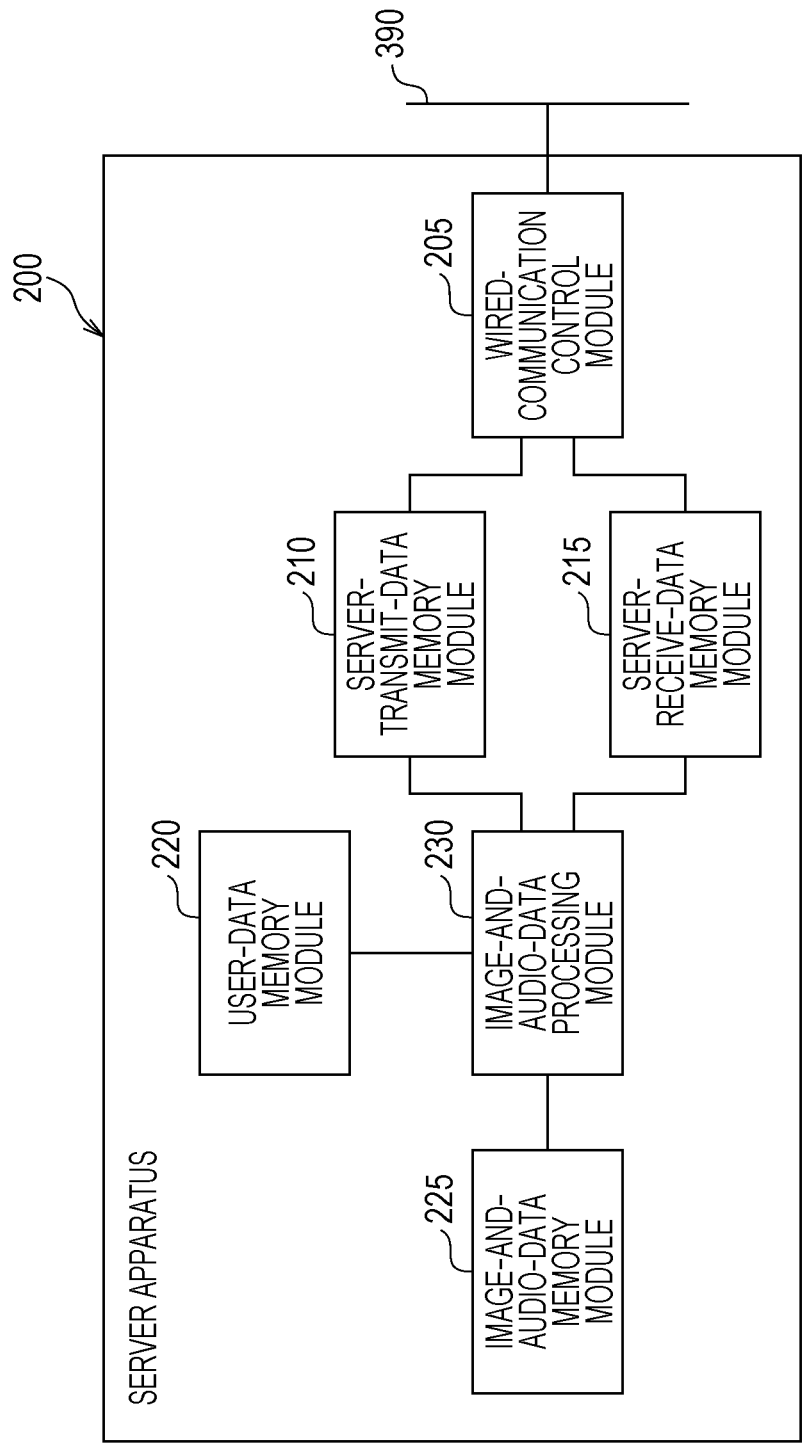
FIG. 2 is a conceptual module configuration diagram of an example configuration of the first exemplary embodiment (a server apparatus)

FIG. 2 is a conceptual module configuration diagram of an example configuration of the first exemplary embodiment (the server apparatus 200).

As illustrated in the example in FIG. 2, the first exemplary embodiment (the server apparatus 200) includes a wired-communication control module 205, a server-transmit-data memory module 210, a server-receive-data memory module 215, a user-data memory module 220, an image-and-audio-data memory module 225, and an image-and-audio-data processing module 230.

The wired-communication control module 205 is connected to the server-transmit-data memory module 210 and the server-receive-data memory module 215 and is also connected to the (wired) communication network 390. The wired-communication control module 205 transmits, via the (wired) communication network 390, advertisement information (advertisement information stored in the server-transmit-data memory module 210) to the digital signage apparatus 100 that is an apparatus for presenting advertisements. The wired-communication control module 205 receives operation information from the digital signage apparatus 100 via the (wired) communication network 390 and stores the operation information in the server-receive-data memory module 215. The operation information may be the operation information received by the digital signage apparatus 100 from the user terminal 300.

The server-transmit-data memory module 210 is connected to the wired-communication control module 205 and the image-and-audio-data processing module 230. The server-transmit-data memory module 210 stores therein data to be transmitted by the wired-communication control module 205 to the digital signage apparatus 100. Specifically, the data is advertisement information processed by the image-and-audio-data processing module 230.

The server-receive-data memory module 215 is connected to the wired-communication control module 205 and the image-and-audio-data processing module 230. The server-receive-data memory module 215 stores therein data received from the digital signage apparatus 100. The data includes at least operation information.

The user-data memory module 220 is connected to the image-and-audio-data processing module 230. The user-data memory module 220 stores therein operation information that is data transmitted from the digital signage apparatus 100 and that is transmitted from the user terminal 300.

The image-and-audio-data memory module 225 is connected to the image-and-audio-data processing module 230. The image-and-audio-data memory module 225 stores therein advertisement information.

The image-and-audio-data processing module 230 is connected to the server-transmit-data memory module 210, the server-receive-data memory module 215, the user-data memory module 220, and the image-and-audio-data memory module 225. After the wired-communication control module 205 receives the operation information, the image-and-audio-data processing module 230 performs conversion leading to reduction of the amount of advertisement information. Specifically, the image-and-audio-data processing module 230 performs conversion such as processing for increasing a compression ratio or processing for reducing an image. The image-and-audio-data processing module 230 stores the advertisement information having undergone the conversion in the server-transmit-data memory module 210.

The wired-communication control module 205 transmits the advertisement information (the advertisement information stored in the server-transmit-data memory module 210) having undergone the conversion by the image-and-audio-data processing module 230 to the digital signage apparatus 100 via the (wired) communication network 390.

In addition, the wired-communication control module 205 may receive a variable for the conversion from the digital signage apparatus 100. For example, the result of communication band measurement may be used as the variable.

In this case, the image-and-audio-data processing module 230 may convert the advertisement information on the basis of the variable.

Figure 3:
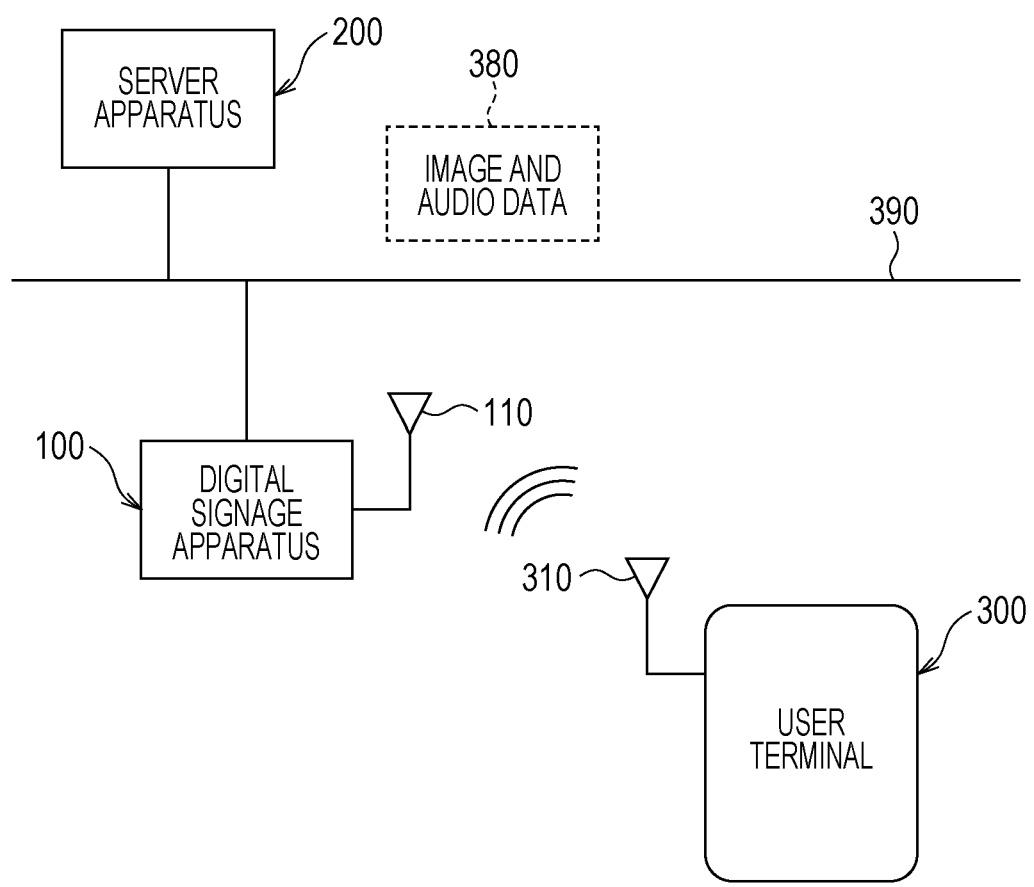
FIG. 3 is an explanatory diagram illustrating an example configuration of a system using the first exemplary embodiment.

FIG. 3 is an explanatory diagram illustrating an example configuration of a system using the first exemplary embodiment.

The digital signage apparatus 100 and the server apparatus 200 are connected to each other via the (wired) communication network 390. The (wired) communication network 390 may be, for example, the Internet serving as a communication infrastructure, an intranet, or the like. The function (advertisement delivery function) of the digital signage apparatus 100 may be implemented as a cloud service. The server apparatus 200 transmits image and audio data 380 to the digital signage apparatus 100, and the digital signage apparatus 100 presents the image and audio data 380 that is advertisement information.

For wireless communication between the digital signage apparatus 100 and the user terminal 300, IEEE 802.11ad may be used. The user who is the owner of the user terminal 300 browses the advertisement information presented by the digital signage apparatus 100. The user performs an operation for advertisement search, designation, or the like by operating the user terminal 300. Information regarding the operation is transmitted to the digital signage apparatus 100 through the wireless communication and is further transmitted from the digital signage apparatus 100 to the server apparatus 200. The server apparatus 200 searches for advertisement information in accordance with the operation information and then transmits the found advertisement information. However, after receiving the operation information, the server apparatus 200 transmits the advertisement information with the amount of information reduced compared with a state before the operation information is received. Accordingly, even if an operation is performed during the advertisement presentation, stopping of the presentation may be minimized.

The system illustrated in FIG. 3 provides two-way operations between a user operation and image display and audio output performed by the digital signage apparatus 100.

While streaming communication from the server apparatus 200 is being performed on the image and audio data 380, operation data regarding a user operation on an antenna 310 is received by the digital signage apparatus 100. In a case where the two-way operations are performed, a delay in data transmission or reception in communication between the server apparatus 200 and the digital signage apparatus 100 causes a deference between displaying of the content of a moving image and an operation. Thus, for example, communication states are monitored, and the amount of communication for an image and data is reduced to enable a used band to be kept at a predetermined level or lower.

Receiving image and audio data from the server apparatus 200 and receiving operation data from the user terminal 300 are performed through respective paths. The load on the digital signage apparatus 100 is thereby distributed, and system operations are thus stabilized. Upon start of the two-way operations, the communication band is automatically maintained in accordance with the communication state. It is thereby possible to prevent a difference between displaying of the content of an image and an operation. In addition, upon completion of the two-way operations, the original image and audio data communication state may be automatically restored. To detect the completion of the two-way operations, for example, the completion of an operation by using the user terminal 300 may be detected, or a state where the digital signage apparatus 100 is no longer able to wirelessly communicate with the user terminal 300 (such as a state where a distance between the user terminal 300 and the digital signage apparatus 100 becomes such a distance that does not allow wireless communication) may be detected.

For example, the system is used as below.

A user S visits a shopping mall on a holiday. The user S intends to buy a new garment to be rewarded for work finished last week. Stores are beautifully decorated for Christmas, and the user S is also dressed up with fashionable clothes, shoes, and glasses as beautifully as the stores. The glasses worn (the user terminal 300) have a wearable camera function and are usually used as a memo pad. Monitors for the digital signage apparatus 100 are installed in the shopping mall and display images for introducing articles of trade in the stores and Christmas items one after another. When the user S approaches a monitor displaying images for introducing garments (advertisement information), the display introducing articles becomes small, and images of women in fashionable clothes and window displays that have drawn attention so far are displayed on the monitor one after another. When an image of a garment similar to a garment intended to be bought that day is displayed, the user S points at the garment with the right hand. The size of the image made small is then changed to the original size, and displaying images of similar articles and guidance of stores are started. The user S heads for a store guided by the monitor and successfully buys a favorite garment.

Note that the gesture of pointing with the right hand made by the user S is an operation by an operator and corresponds to operation information for selecting an advertisement. Specifically, the worn glasses (the user terminal 300) detect the gesture of pointing with the right hand. The user terminal 300 transmits the pointing gesture and the date and time when the gesture is made (year, month, day, hour, minute, second, and a time unit equal to or less than a second, or a combination of any of these may be used) to the digital signage apparatus 100, and the digital signage apparatus 100 transmits the pointing gesture and the date and time to the server apparatus 200. The server apparatus 200 identifies the garment presented at the date and time by the digital signage apparatus 100, extracts advertisement information regarding the garment, converts the advertisement information with an enhanced compression ratio, and transmits the advertisement information to the digital signage apparatus 100. Even after receiving the operation information, the digital signage apparatus 100 may display the advertisement information smoothly.

Alternatively, the worn glasses (the user terminal 300) may detect the pointed garment. The user terminal 300 may transmit information uniquely indicating the garment (such as an article ID) to the digital signage apparatus 100, and the digital signage apparatus 100 may transmit the article ID to the server apparatus 200. The server apparatus 200 may extract advertisement information regarding the article ID, convert the advertisement information with an enhanced compression ratio, and transmit the advertisement information to the digital signage apparatus 100.

FIGS. 4A and 4B are flowcharts illustrating example processing performed by the first exemplary embodiment.

The example processing is performed for performing operations for acquiring an expected service by using the user terminal 300 on the basis of images and audio displayed on the digital signage apparatus 100.

First, the overview of the processing will be described.

(1) The server apparatus 200 delivers image and audio data, and the digital signage apparatus 100 performs image display and audio output [steps S402a and S402b].

(2) The user terminal 300 such as a smartphone starts an application and performs Bluetooth Low Energy (BLE) scan to search for the digital signage apparatus 100 transmitting BLE advertising [steps S404b and S402c].

(3) The digital signage apparatus 100 delivers, to the user terminal 300, information regarding a service set identifier (SSID), a wireless fidelity (Wi-Fi) protected access-pre-shared key (WPA-PSK) passphrase, and a media access control (MAC) address as BLE data used for Wi-Fi Direct connection [steps S406b and S404c].

(4) The digital signage apparatus 100 delivers a beacon as Wi-Fi Direct GO. The user terminal 300 performs Wi-Fi Direct connection settings by using the Wi-Fi Direct connection information received as the BLE data [steps S408b and S406c].

(5) The digital signage apparatus 100 and the user terminal 300 are connected to each other through Wi-Fi Direct by using the Wi-Fi Direct connection information [steps S410b and S408c].

(6) To ensure a communication band for the two-way operations, the digital signage apparatus 100 transmits an image and audio parameter change request to the server apparatus 200 and receives a response from the server apparatus 200 [steps S404a and S412b].

(7) The digital signage apparatus 100 transmits information regarding a measured communication band to the server apparatus 200. To save a band for receiving operation data, the server apparatus 200 performs conversion to image and audio data in which the image quality of image data, the resolution, the encoding method, or the like is changed [steps S406a and S414b].

(8) The server apparatus 200 delivers the image and audio data having undergone the conversion, and the digital signage apparatus 100 changes the image display and the audio output [steps S408a and S416b].

(9) The user terminal 300 transmits operation data to the digital signage apparatus 100. The operation data is herein data regarding an image that is taken with the camera of the user terminal 300 and that is then selected [steps S418b and S410c].

(10) The digital signage apparatus 100 transmits, to the server apparatus 200, the operation data received from the user terminal 300 [steps S410a and S420b].

(11) The server apparatus 200 analyzes the image data received from the user terminal 300 and extracts an article having similar characteristics from articles in the server apparatus 200 [step S412a].

(12) The server apparatus 200 converts image and audio data regarding the article extracted on the basis of the operation data [step S414a].

(13) The server apparatus 200 delivers the image and audio data having undergone the conversion, and the digital signage apparatus 100 changes the image display and the audio output [steps S416a and S422b].

(14) If the image and the audio output from the digital signage apparatus 100 represent an expected article, a user selects completion of operations of the user terminal 300. If the image and the audio represent an article different from the expected article, the user selects another image data in the user terminal 300 as the operation data. The processing is subsequently performed from steps S418b and S410c [step S412c].

(15) If the completion of the two-way operations of the user terminal 300 is verified, the digital signage apparatus 100 transmits a request for restoring normally used image and audio parameters to the server apparatus 200 [steps S418a and S424b].

(16) The server apparatus 200 delivers the image and audio data having undergone the conversion, and the digital signage apparatus 100 changes the image display and the audio output [steps S420a and S426b].

The processing will be described in detail.

In step S402a, the server apparatus 200 delivers the image and audio data to the digital signage apparatus 100 (Data Send).

In step S402b, the digital signage apparatus 100 performs the image display and the audio output.

In step S404b, the digital signage apparatus 100 notifies the user terminal 300 of the information regarding the digital signage apparatus 100 (BLE Peripheral and Advertising).

In step S402c, the user terminal 300 searches for the digital signage apparatus 100 (BLE Central and Scan).

In step S406b, the digital signage apparatus 100 notifies the user terminal 300 of the Wi-Fi Direct connection information (Data Send).

In step S404c, the user terminal 300 receives the Wi-Fi Direct connection information from the digital signage apparatus 100 (Data Request).

In step S408b, the digital signage apparatus 100 transmits the Wi-Fi Direct beacon to the user terminal 300 (Wi-Fi Direct GO and Beacon).

In step S406c, the user terminal 300 performs the Wi-Fi Direct connection settings (Wi-Fi Direct Client).

In step S408c, the user terminal 300 performs Wi-Fi Direct connection processing (Request).

In step S410b, the digital signage apparatus 100 performs Wi-Fi Direct connection processing (Response).

In step S412b, the digital signage apparatus 100 transmits the image and audio parameter change request to the server apparatus 200 (Request).

In step S404a, the server apparatus 200 receives the image and audio parameter change request from the digital signage apparatus 100 (Response).

In step S414b, the digital signage apparatus 100 notifies the server apparatus 200 of the result of the communication band measurement (Data Send).

In step S406a, the server apparatus 200 converts the image and audio data.

In step S408a, the server apparatus 200 delivers the image and audio data to the digital signage apparatus 100 (Data Send).

In step S416b, the digital signage apparatus 100 performs the image display and the audio output.

In step S410c, the user terminal 300 transmits the operation data to the digital signage apparatus 100 (Data Send).

In step S418b, the digital signage apparatus 100 receives the operation data from the user terminal 300.

In step S420b, the digital signage apparatus 100 transmits the operation data to the server apparatus 200 (Data Send).

In step S410a, the server apparatus 200 receives the operation data from the digital signage apparatus 100.

In step S412a, the server apparatus 200 analyzes the operation data.

In step S414a, the server apparatus 200 converts the image and audio data.

In step S416a, the server apparatus 200 delivers the image and audio data to the digital signage apparatus 100 (Data Send).

In step S422b, the digital signage apparatus 100 performs the image display and the audio output.

In step S424b, the digital signage apparatus 100 transmits the image and audio parameter change request to the server apparatus 200 (Request).

In step S418a, the server apparatus 200 receives the image and audio parameter change request from the digital signage apparatus 100 (Response).

In step S420a, the server apparatus 200 delivers the image and audio data to the digital signage apparatus 100 (Data Send).

In step S426b, the digital signage apparatus 100 performs the image display and the audio output.

In step S412c, the user terminal 300 judges whether a user operation is performed. If a user operation is performed, the processing returns to step S410c. In the other cases, the processing is terminated.

Figure 5A:
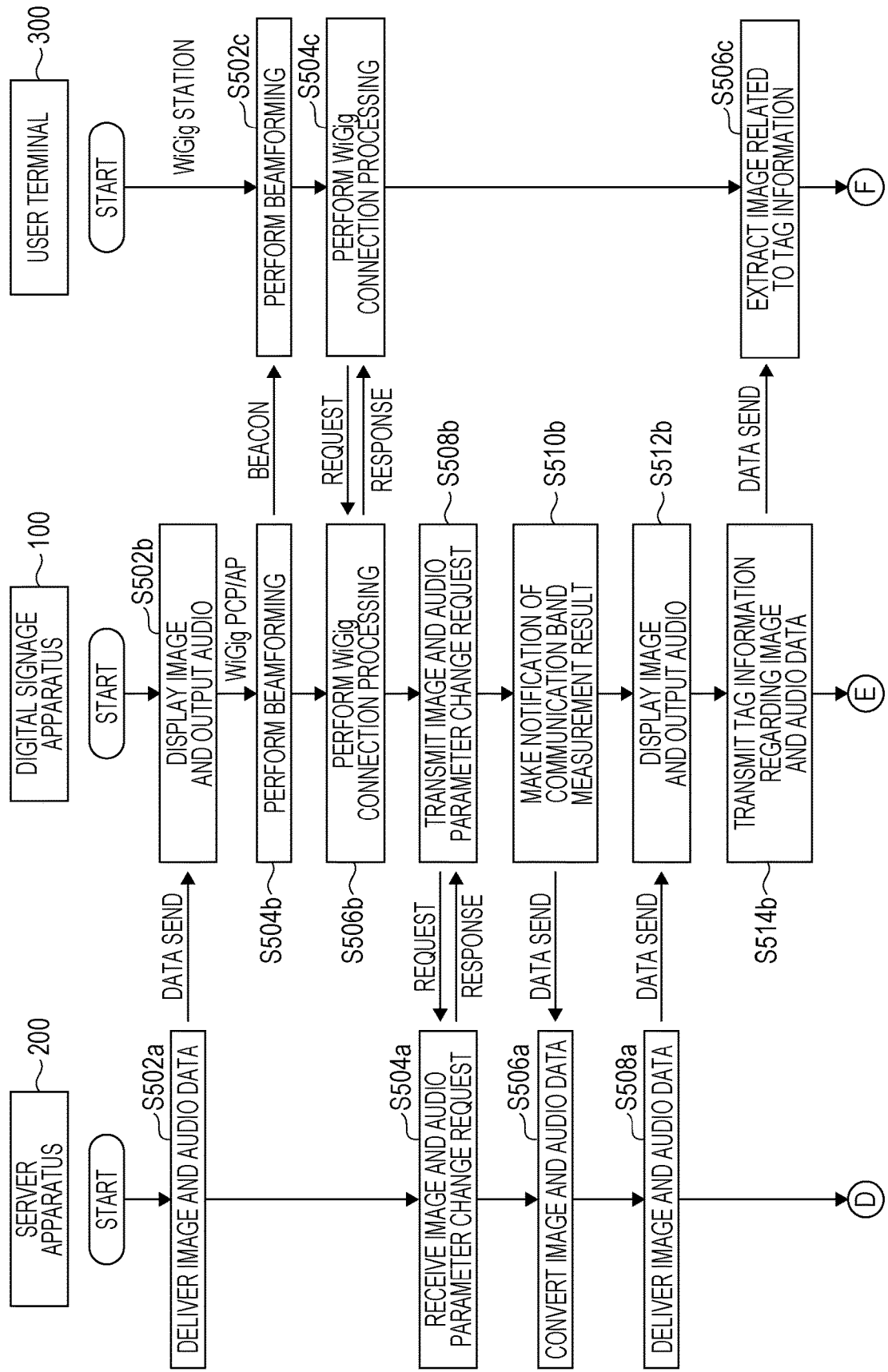

FIGS. 5A and 5B are flowcharts illustrating different example processing performed by the first exemplary embodiment, that is, example processing performed by the digital signage apparatus 100 in the two-way operations in wireless gigabit (WiGig) connection.

First, the overview of the processing will be described.

(1) The server apparatus 200 delivers image and audio data, and the digital signage apparatus 100 performs image display and audio output [steps S502a and S502b].

(2) The digital signage apparatus 100 transmits a beacon, serving as a WiGig personal basic service set (PBSS) central point/access point (PCP/AP). The digital signage apparatus 100 performs beamforming (sector level sweep and beamforming training) between the user terminal 300 serving as a WiGig station and the digital signage apparatus 100 and adjusts the mutual directivities of the antennas of these apparatuses [steps S504b and S502c].

(3) The digital signage apparatus 100 and the user terminal 300 perform WiGig connection processing and are connected peer-to-peer [steps S506b and S504c].

(4) To ensure a communication band for the two-way operations, the digital signage apparatus 100 transmits an image and audio parameter change request to the server apparatus 200 and receives a response from the server apparatus 200 [steps S504a and S508b].

(5) The digital signage apparatus 100 transmits information regarding a measured communication band to the server apparatus 200. To save a band for receiving operation data, the server apparatus 200 performs conversion to image and audio data in which the image quality of image data, the resolution, the encoding method, or the like is changed [steps S506a and S510b].

(6) The server apparatus 200 delivers the image and audio data having undergone the conversion, and the digital signage apparatus 100 changes the image display and the audio output [steps S508a and S512b].

(7) The digital signage apparatus 100 transmits, to the user terminal 300, tag information indicating the characteristics of the image and audio data being output [steps S514b and S506c].

(8) The user terminal 300 transmits operation data to the digital signage apparatus 100. In the example processing in the flowcharts, image data set is used as the operation data. In the image data set, data corresponding to the tag information transmitted and received in steps S514b and S506c has been automatically selected from data items regarding images taken with the camera of the user terminal 300 [steps S516b and S508c].

(9) The digital signage apparatus 100 transmits, to the server apparatus 200, the operation data received from the user terminal 300 [steps S510a and S518b].

(10) The server apparatus 200 analyzes the image data received from the user terminal 300 and extracts an article having similar characteristics from articles in the server apparatus 200 [step S512a].

(11) The server apparatus 200 converts image and audio data regarding the article extracted on the basis of the operation data [step S514a].

(12) The server apparatus 200 delivers the image and audio data having undergone the conversion, and the digital signage apparatus 100 changes the image display and the audio output [steps S516a and S520b].

(13) If the image and the audio output from the digital signage apparatus 100 is an expected article, the user makes a gesture expressing the completion of the two-way operations. The digital signage apparatus 100 analyzes an image taken with the camera and recognizes the completion of the operations. If the image and the audio represent an article different from the expected article, the user makes a gesture expressing change of the article, and operation data indicating that searching is to be performed again is thereby transmitted. The processing is subsequently performed from steps S516b and S508c [step S510c].

(14) If the completion of the two-way operations of the user terminal 300 is verified, the digital signage apparatus 100 transmits a request for restoring normally used image and audio parameters to the server apparatus 200 [steps S518a and S522b].

(15) The server apparatus 200 delivers the image and audio data having undergone the conversion, and the digital signage apparatus 100 changes the image display and the audio output [steps S520a and S524b].

The processing will be described in detail.

In step S502a, the server apparatus 200 delivers the image and audio data to the digital signage apparatus 100 (Data Send).

In step S502b, the digital signage apparatus 100 performs the image display and the audio output.

In step S504b, the digital signage apparatus 100 performs the beamforming (WiGig PCP/AP and Beacon). Processing in two steps (1) sector level sweep and (2) beamforming training is performed as the beamforming.

In step S502c, the user terminal 300 performs the beamforming (WiGig Station).

In step S506b, the digital signage apparatus 100 performs the WiGig connection processing (Wi-Fi Direct GO and Response).

In step S504c, the user terminal 300 performs the WiGig connection processing (Request).

In step S508b, the digital signage apparatus 100 transmits the image and audio parameter change request to the server apparatus 200 (Request).

In step S504a, the server apparatus 200 receives the image and audio parameter change request from the digital signage apparatus 100 (Response).

In step S510b, the digital signage apparatus 100 notifies the server apparatus 200 of the result of the communication band measurement (Data Send).

In step S506a, the server apparatus 200 converts the image and audio data.

In step S508a, the server apparatus 200 delivers the image and audio data to the digital signage apparatus 100 (Data Send).

In step S512b, the digital signage apparatus 100 performs the image display and the audio output.

In step S514b, the digital signage apparatus 100 transmits the tag information regarding the image and audio data to the user terminal 300 (Data Send).

In step S506c, the user terminal 300 extracts an image related to the tag information.

In step S508c, the user terminal 300 transmits the operation data to the digital signage apparatus 100 (Data Send).

In step S516b, the digital signage apparatus 100 receives the operation data from the user terminal 300.

In step S518b, the digital signage apparatus 100 transmits the operation data to the server apparatus 200 (Data Send).

In step S510a, the server apparatus 200 receives the operation data from the digital signage apparatus 100.

In step S512a, the server apparatus 200 analyzes the operation data.

In step S514a, the server apparatus 200 converts the image and audio data.

In step S516a, the server apparatus 200 delivers the image and audio data to the digital signage apparatus 100 (Data Send).

In step S520b, the digital signage apparatus 100 performs the image display and the audio output.

In step S522b, the digital signage apparatus 100 transmits the image and audio parameter change request to the server apparatus 200 (Request).

In step S518a, the server apparatus 200 receives the image and audio parameter change request from the digital signage apparatus 100 (Response).

In step S520a, the server apparatus 200 delivers the image and audio data to the digital signage apparatus 100 (Data Send).

In step S524b, the digital signage apparatus 100 performs the image display and the audio output.

In step S510c, the user terminal 300 judges whether a user operation is performed. If a user operation is performed, the processing returns to step S508c. In the other cases, the processing is terminated.

Second Exemplary Embodiment

Figure 6:
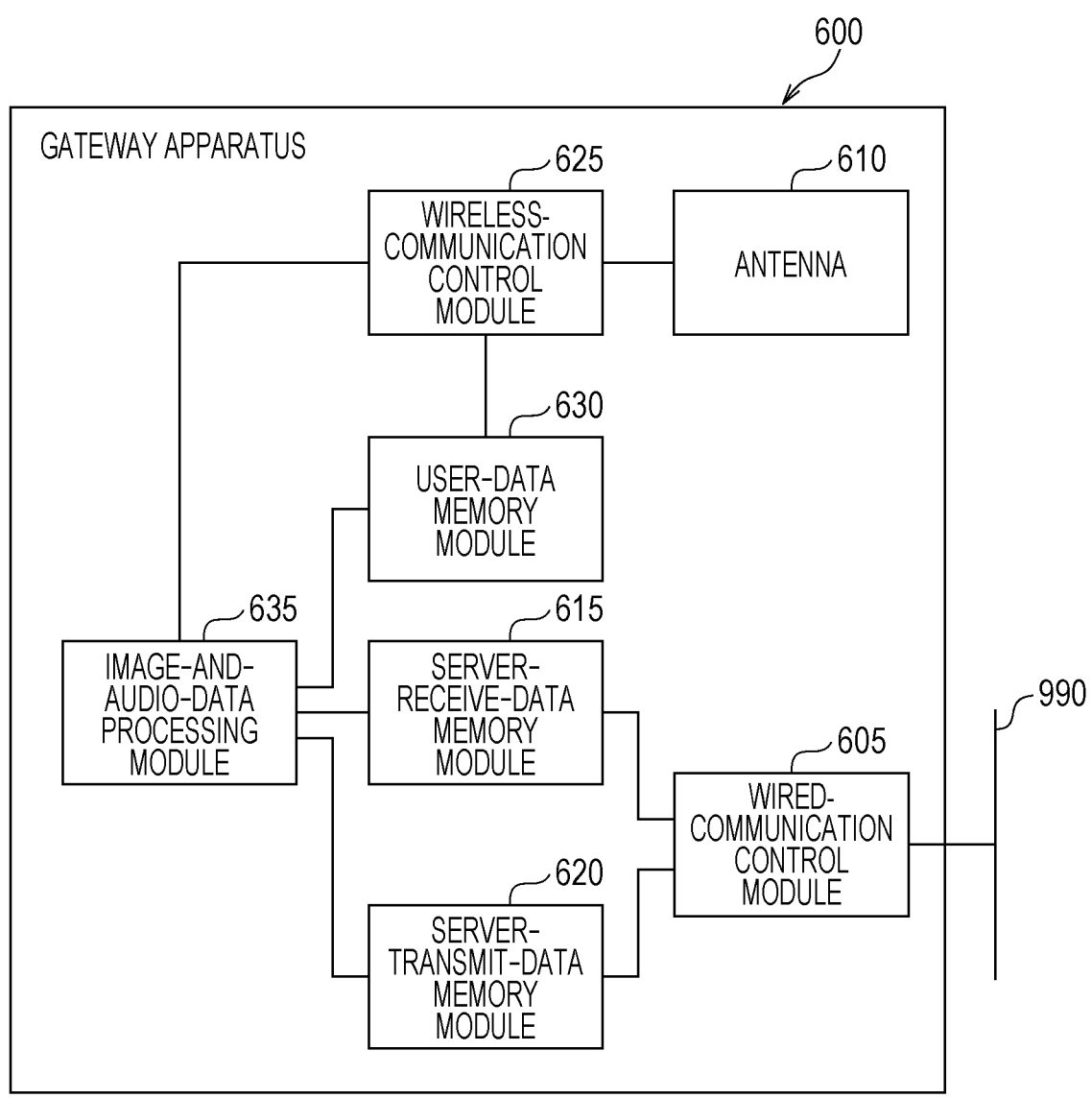
FIG. 6 is a conceptual module configuration diagram of an example configuration of a second exemplary embodiment (a gateway apparatus)

FIG. 6 is a conceptual module configuration diagram of an example configuration of a second exemplary embodiment (a gateway apparatus 600).

As illustrated in the example in FIG. 6, the second exemplary embodiment (the gateway apparatus 600) includes a wired-communication control module 605, an antenna 610, a server-receive-data memory module 615, a server-transmit-data memory module 620, a wireless-communication control module 625, a user-data memory module 630, and an image-and-audio-data processing module 635. The gateway apparatus 600 is capable of wirelessly communicating with a user terminal 800 and is also capable of communicating with a server apparatus 700 via a (wired) communication network 990. For the wireless communication with the user terminal 800, IEEE 802.11ad may be used.

The wired-communication control module 605 is connected to the server-receive-data memory module 615 and the server-transmit-data memory module 620 and is also connected to the (wired) communication network 990. The wired-communication control module 605 communicates with the server apparatus 700 via the (wired) communication network 990 (such as Ethernet).

The server-receive-data memory module 615 is connected to the wired-communication control module 605 and the image-and-audio-data processing module 635. The server-receive-data memory module 615 stores therein data (advertisement information received from the server apparatus 700) received by the wired-communication control module 605. Note that advertisement information includes image information indicating the content of an advertisement (including still image information and moving image information), audio information, and combined these pieces of information.

The server-transmit-data memory module 620 is connected to the wired-communication control module 605 and the image-and-audio-data processing module 635. The server-transmit-data memory module 620 stores therein data to be transmitted by the wired-communication control module 605 to the server apparatus 700. Specifically, the server-transmit-data memory module 620 stores therein operation information transmitted from the user terminal 800 (operation information that is data stored in the user-data memory module 630 and that is received from the user terminal 800).

The antenna 610 is connected to the wireless-communication control module 625. The antenna 610 is a device for wirelessly communicating with the user terminal 800. The antenna 610 may be capable of using IEEE 802.11ad.

The wireless-communication control module 625 is connected to the antenna 610, the user-data memory module 630, and the image-and-audio-data processing module 635. The wireless-communication control module 625 controls wireless communication with the user terminal 800 by using the antenna 610. Specifically, the wireless-communication control module 625 receives operation information from the user terminal 800 and transmits, to the user terminal 800, a reply from the server apparatus 700 in response to the operation information.

The user-data memory module 630 is connected to the wireless-communication control module 625 and the image-and-audio-data processing module 635. The user-data memory module 630 stores therein data received by the wireless-communication control module 625 from the user terminal 800. The stored data corresponds to, for example, operation information indicating an operation for searching for an advertisement intended to be seen by a user, designating an advertisement, or the like.

The image-and-audio-data processing module 635 is connected to the server-receive-data memory module 615, the server-transmit-data memory module 620, the wireless-communication control module 625, and the user-data memory module 630. The image-and-audio-data processing module 635 performs processing of conversion, to data that may be output, from data for image display and data for audio output that are advertisement information.

Figure 7:
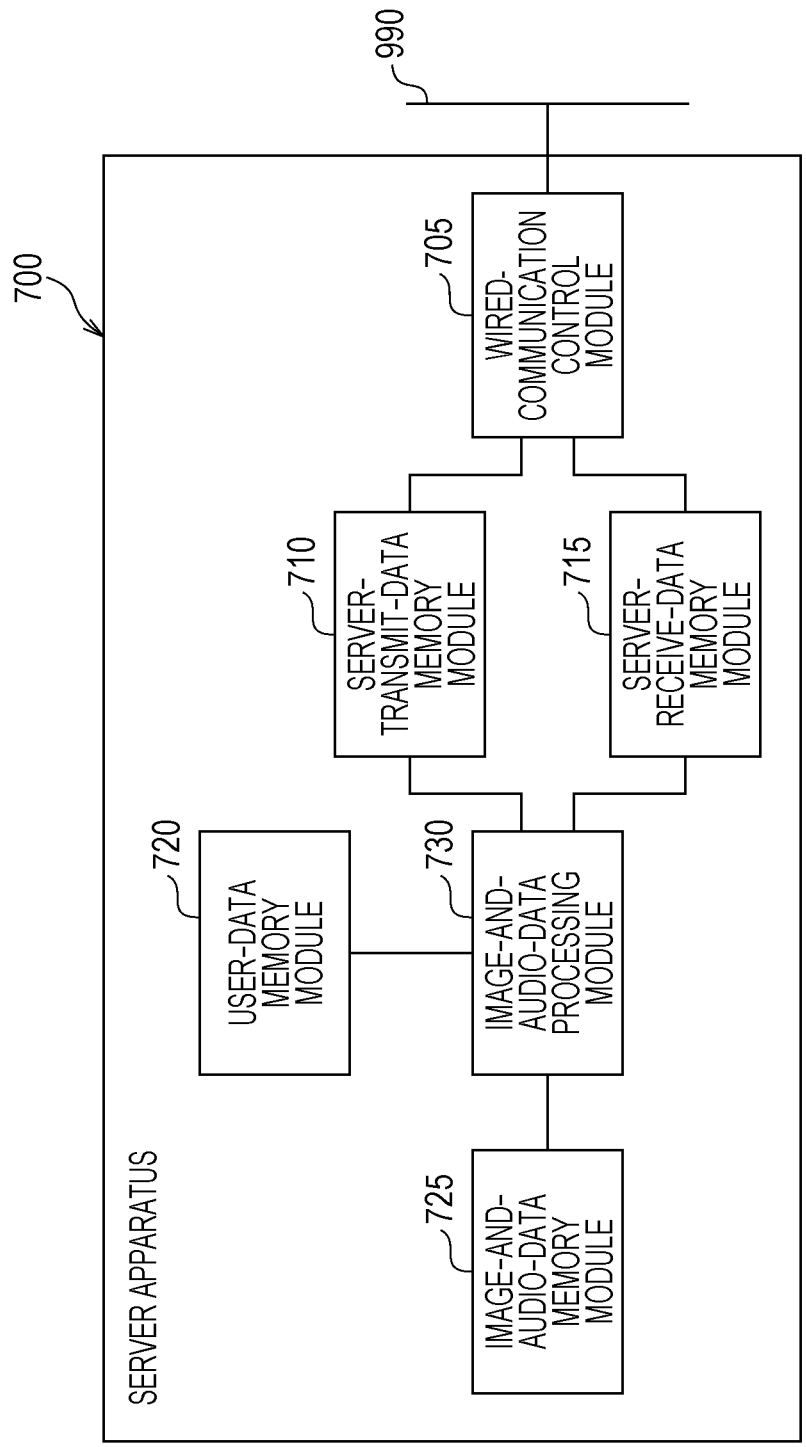
FIG. 7 is a conceptual module configuration diagram of an example configuration of the second exemplary embodiment (a server apparatus)

FIG. 7 is a conceptual module configuration diagram of an example configuration of the second exemplary embodiment (the server apparatus 700).

As illustrated in the example in FIG. 7, the second exemplary embodiment (the server apparatus 700) includes a wired-communication control module 705, a server-transmit-data memory module 710, a server-receive-data memory module 715, a user-data memory module 720, an image-and-audio-data memory module 725, and an image-and-audio-data processing module 730.

The wired-communication control module 705 is connected to the server-transmit-data memory module 710 and the server-receive-data memory module 715 and is also connected to the (wired) communication network 990. The wired-communication control module 705 transmits, via the (wired) communication network 990 and the gateway apparatus 600, advertisement information (advertisement information stored in the server-transmit-data memory module 710) to the user terminal 800 that is an apparatus for presenting advertisements. The wired-communication control module 705 receives the operation information from the user terminal 800 via the (wired) communication network 990 and stores the operation information in the server-receive-data memory module 715. The operation information may be the operation information received by the gateway apparatus 600 from the user terminal 800.

The server-transmit-data memory module 710 is connected to the wired-communication control module 705 and the image-and-audio-data processing module 730. The server-transmit-data memory module 710 stores therein data to be transmitted by the wired-communication control module 705 to the gateway apparatus 600. Specifically, the data is advertisement information processed by the image-and-audio-data processing module 730.

The server-receive-data memory module 715 is connected to the wired-communication control module 705 and the image-and-audio-data processing module 730. The server-receive-data memory module 715 stores therein data received from the gateway apparatus 600. The data includes at least operation information.

The user-data memory module 720 is connected to the image-and-audio-data processing module 730. The user-data memory module 720 stores therein operation information that is data transmitted from the gateway apparatus 600 and that is transmitted from the user terminal 800.

The image-and-audio-data memory module 725 is connected to the image-and-audio-data processing module 730. The image-and-audio-data memory module 725 stores therein advertisement information.

The image-and-audio-data processing module 730 is connected to the server-transmit-data memory module 710, the server-receive-data memory module 715, the user-data memory module 720, and the image-and-audio-data memory module 725. After the wired-communication control module 705 receives the operation information, the image-and-audio-data processing module 730 performs conversion leading to reduction of the amount of advertisement information. Specifically, the image-and-audio-data processing module 730 performs conversion such as processing for increasing a compression ratio or processing for reducing an image. The image-and-audio-data processing module 730 stores the advertisement information having undergone the conversion in the server-transmit-data memory module 710.

The wired-communication control module 705 transmits the advertisement information (the advertisement information stored in the server-transmit-data memory module 710) having undergone the conversion by the image-and-audio-data processing module 730 to the gateway apparatus 600 via the (wired) communication network 990.

The wired-communication control module 705 may receive a variable for the conversion from the gateway apparatus 600. For example, the result of communication band measurement may be used as the variable.

In this case, the image-and-audio-data processing module 730 may convert the advertisement information on the basis of the variable.

Figure 8:
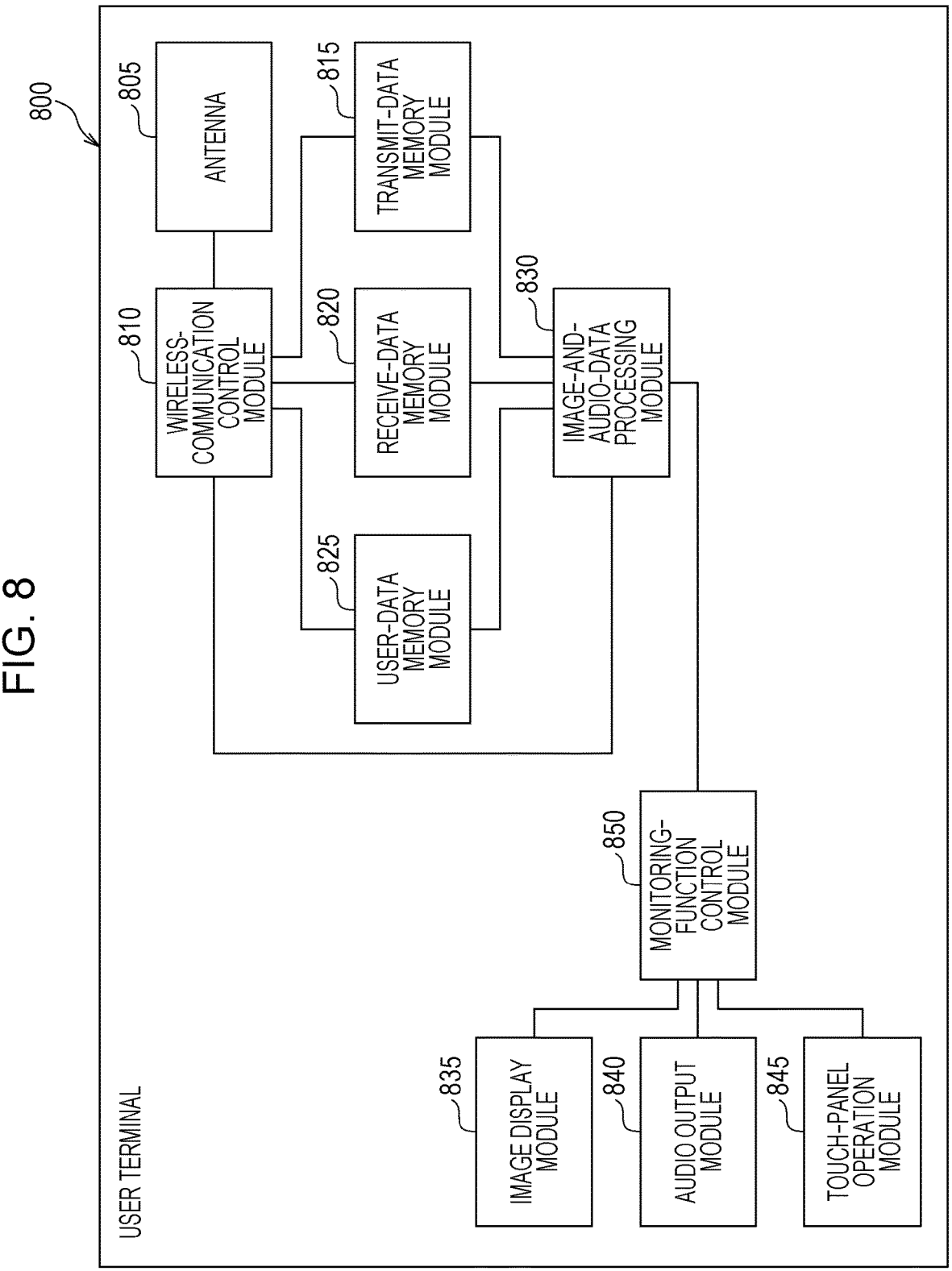
FIG. 8 is a conceptual module configuration diagram of an example configuration of the second exemplary embodiment (a user terminal)

FIG. 8 is a conceptual module configuration diagram of an example configuration of the second exemplary embodiment (the user terminal 800).

As illustrated in the example in FIG. 8, the second exemplary embodiment (the user terminal 800) includes an antenna 805, a wireless-communication control module 810, a transmit-data memory module 815, a receive-data memory module 820, a user-data memory module 825, an image-and-audio-data processing module 830, an image display module 835, an audio output module 840, a touch-panel operation module 845, and a monitoring-function control module 850.

The antenna 805 is connected to the wireless-communication control module 810. The antenna 805 is a device for wirelessly communicating with the gateway apparatus 600. The antenna 805 may be capable of using IEEE 802.11ad.

The wireless-communication control module 810 is connected to the antenna 805, the transmit-data memory module 815, the receive-data memory module 820, the user-data memory module 825, and the image-and-audio-data processing module 830. The wireless-communication control module 810 controls wireless communication with the gateway apparatus 600 by using the antenna 805. Specifically, the wireless-communication control module 810 transmits operation information to the gateway apparatus 600 and receives, via the gateway apparatus 600, a reply from the server apparatus 700 in response to the operation information.

The transmit-data memory module 815 is connected to the wireless-communication control module 810 and the image-and-audio-data processing module 830. The transmit-data memory module 815 stores therein data to be transmitted by the user terminal 800 to the server apparatus 700 via the gateway apparatus 600.

The receive-data memory module 820 is connected to the wireless-communication control module 810 and the image-and-audio-data processing module 830. The receive-data memory module 820 stores therein data received by the antenna 805 (advertisement information received from the gateway apparatus 600). Note that advertisement information includes image information indicating the content of an advertisement (including still image information and moving image information), audio information, and combined these pieces of information.

The user-data memory module 825 is connected to the wireless-communication control module 810 and the image-and-audio-data processing module 830. The user-data memory module 825 stores operation information received by the touch-panel operation module 845. The operation information is transmitted by the antenna 805 to the server apparatus 700 via the gateway apparatus 600. For example, the operation information corresponds to operation information indicating an operation for searching for an advertisement intended to be seen by the user, designating an advertisement, or the like.

The image-and-audio-data processing module 830 is connected to the wireless-communication control module 810, the transmit-data memory module 815, the receive-data memory module 820, the user-data memory module 825, and the monitoring-function control module 850. The image-and-audio-data processing module 830 performs processing of conversion, to data that may be output, from data for image display and data for audio output that are advertisement information.

The monitoring-function control module 850 is connected to the image-and-audio-data processing module 830, the image display module 835, the audio output module 840, and the touch-panel operation module 845. The monitoring-function control module 850 controls the image display module 835, the audio output module 840, and the touch-panel operation module 845 and presents advertisement information processed by the image-and-audio-data processing module 830.

The image display module 835 is connected to the monitoring-function control module 850. The image display module 835 is a display device such as a liquid crystal display and displays an image that is advertisement information, a moving image, and the like under the control of the monitoring-function control module 850.

The audio output module 840 is connected to the monitoring-function control module 850. The audio output module 840 is an audio output device such as a speaker and outputs audio information that is advertisement information under the control of the monitoring-function control module 850.

The touch-panel operation module 845 is connected to the monitoring-function control module 850. The touch-panel operation module 845 is a touch panel or the like. The touch-panel operation module 845 receives a user operation (operation information) and delivers the operation information to the monitoring-function control module 850 (the user-data memory module 825).

Figure 9:
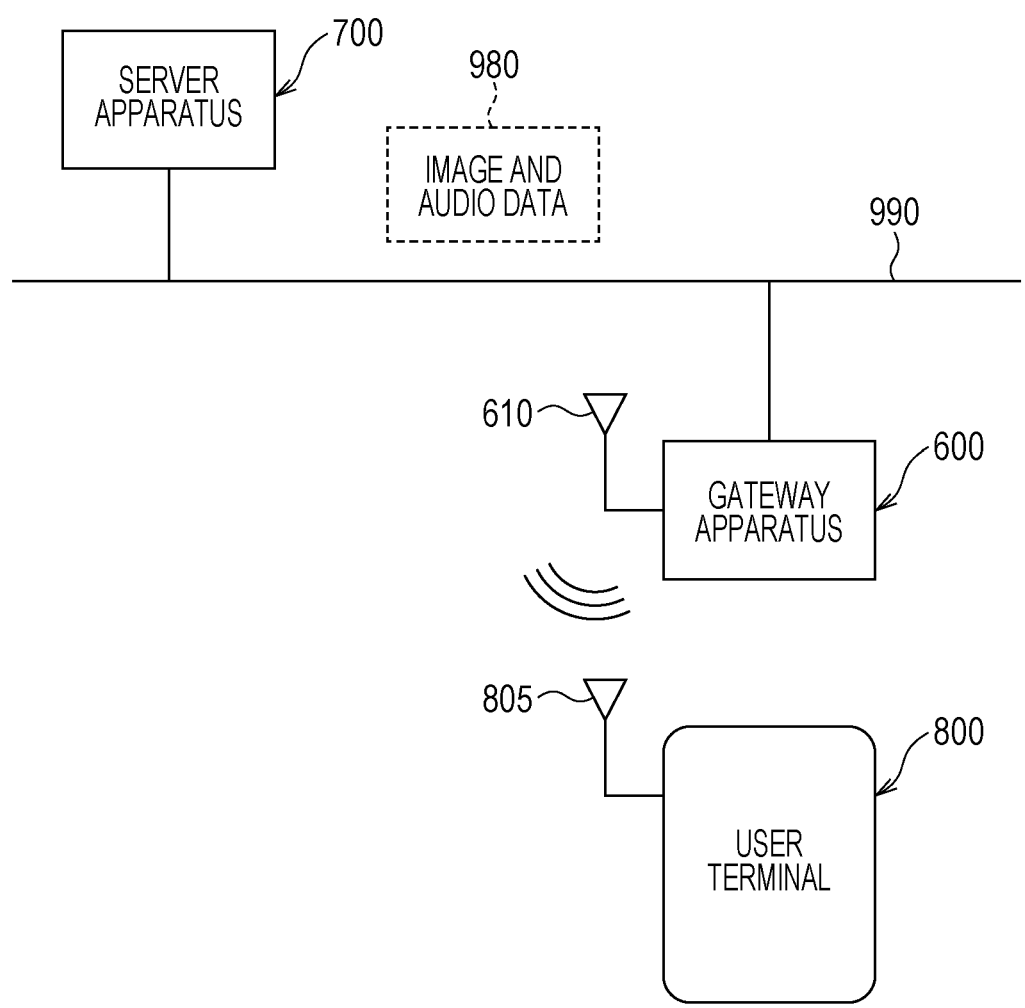
FIG. 9 is an explanatory diagram illustrating an example configuration of a system using the second exemplary embodiment.

FIG. 9 is an explanatory diagram illustrating an example configuration of a system using the second exemplary embodiment.

The gateway apparatus 600 and the server apparatus 700 are connected to each other via the (wired) communication network 990. The (wired) communication network 990 may be, for example, the Internet serving as a communication infrastructure, an intranet, or the like. The function (advertisement delivery function) of the server apparatus 700 may be implemented as a cloud service. Image and audio data 980 is transmitted from the server apparatus 700 to the gateway apparatus 600 and is further transmitted from the antenna 610 of the gateway apparatus 600 to the antenna 805 of the user terminal 800. The user terminal 800 then presents the image and audio data 980 that is advertisement information.

For wireless communication between the gateway apparatus 600 and the user terminal 800, IEEE 802.11ad may be used. The user who is the owner of the user terminal 800 browses the advertisement information presented by the user terminal 800. The user performs an operation for advertisement search, designation, or the like by operating the user terminal 800. Information regarding the operation is transmitted to the gateway apparatus 600 through the wireless communication and is further transmitted from the gateway apparatus 600 to the server apparatus 700. The server apparatus 700 searches for advertisement information in accordance with the operation information and then transmits the found advertisement information. However, after receiving the operation information, the server apparatus 700 transmits the advertisement information with the amount of information reduced compared with a state before the operation information is received. Accordingly, even if an operation is performed during the advertisement presentation, stopping of the presentation may be minimized.

Figure 10A:
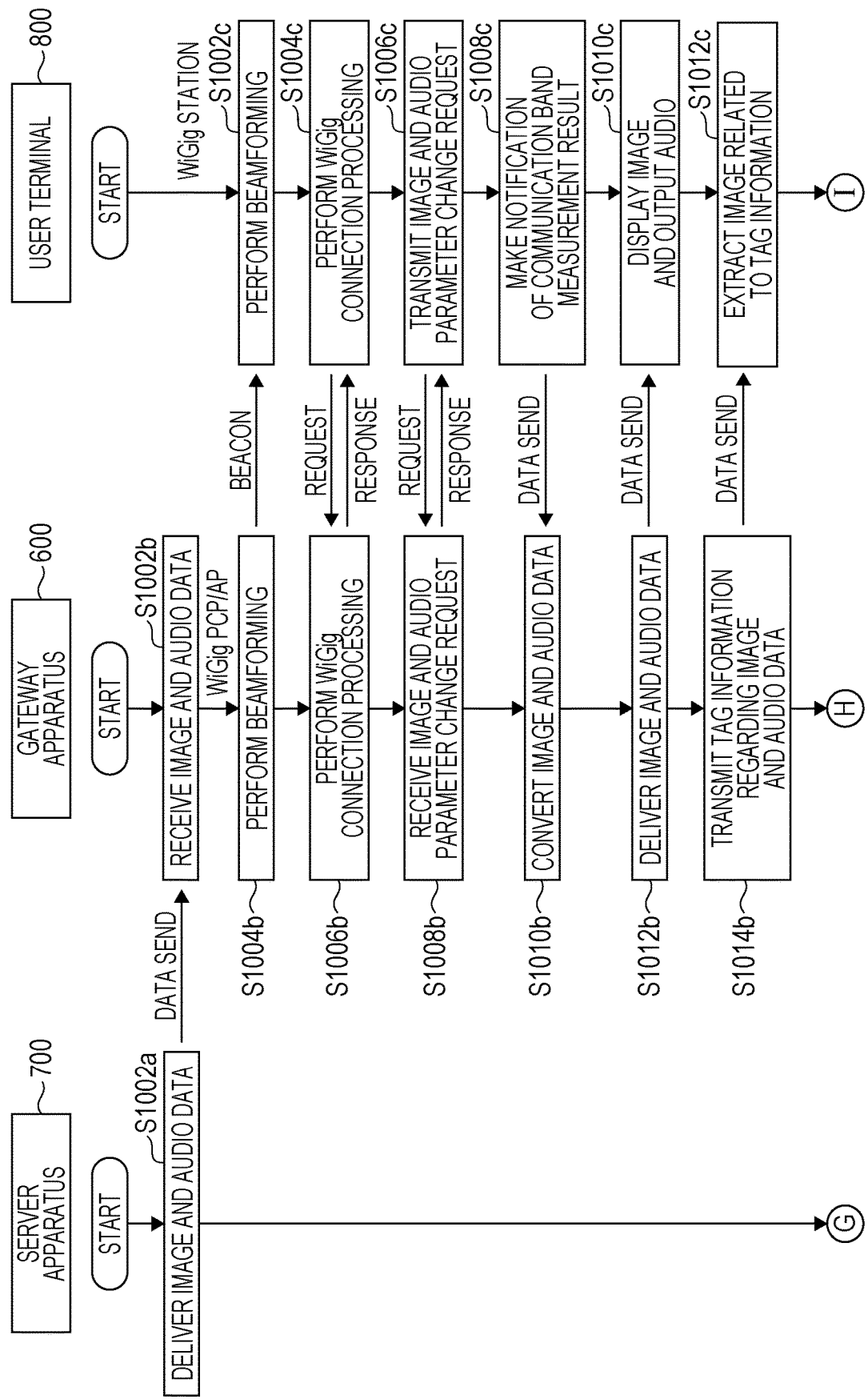
FIGS. 10A and 10B are flowcharts illustrating example processing performed by the second exemplary embodiment.
Figure 10B:
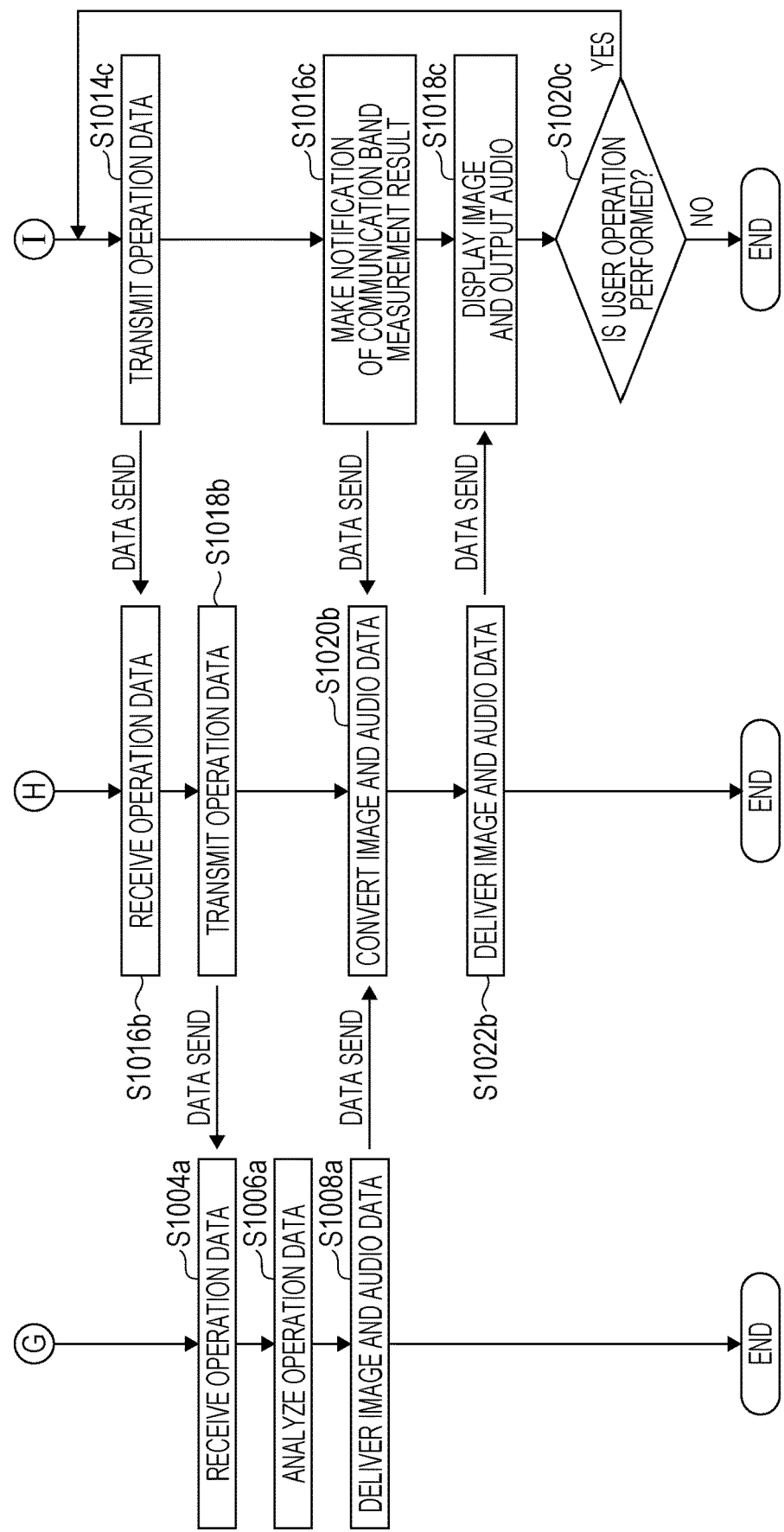

FIGS. 10A and 10B are flowcharts illustrating example processing performed by the second exemplary embodiment, that is, example processing in the two-way operations that is performed by using a digital signage function implemented by the user terminal 800.

First, the overview of the processing will be described.

(1) The server apparatus 700 delivers image and audio data, and the gateway apparatus 600 receives the image and audio data [steps S1002a and S1002b].

(2) The gateway apparatus 600 transmits a beacon, serving as a WiGig PCP/AP. The gateway apparatus 600 performs beamforming (sector level sweep and beamforming training) between the gateway apparatus 600 and the user terminal 800 serving as a WiGig station and adjusts the mutual directivities of the antennas of these apparatuses [steps S1004b and S1002c].

(3) The gateway apparatus 600 and the user terminal 800 perform WiGig connection processing and are connected peer-to-peer [steps S1006b and S1004c].

(4) To ensure a communication band for the two-way operations, the user terminal 800 transmits an image and audio parameter change request to the gateway apparatus 600 and receives a response from the gateway apparatus 600 [steps S1008b and S1006c].

(5) The user terminal 800 transmits information regarding a measured communication band to the gateway apparatus 600. To save a band for receiving operation data, the gateway apparatus 600 performs conversion to image and audio data in which the image quality of image data, the resolution, the encoding method, or the like is changed [steps S1010b and S1008c].

(6) The gateway apparatus 600 delivers the image and audio data having undergone the conversion, and the user terminal 800 changes the image display and the audio output [steps S1012b and S1010c].

(7) The gateway apparatus 600 transmits, to the user terminal 800, tag information indicating the characteristics of the image and audio data being output [steps S1014b and S1012c].

(8) The user terminal 800 transmits operation data to the gateway apparatus 600. In the example processing in the flowcharts, image data set is used as the operation data. In the image data set, data corresponding to the tag information transmitted and received in steps S1014b and S1012c has been automatically selected from data items regarding images taken with the camera of the user terminal 800 [steps S1016b and S1014c].

(9) The gateway apparatus 600 transmits, to the server apparatus 700, the operation data received from the user terminal 800 [steps S1004a and S1018b].

(10) The server apparatus 700 analyzes the operation data received from the user terminal 800 and extracts an article having similar characteristics from articles in the server apparatus 700 [step S1006a].

(11) The server apparatus 700 delivers image and audio data regarding the article extracted on the basis of the operation data to the gateway apparatus 600. The server apparatus 700 also transmits update information regarding the communication band measured by the user terminal 800 to the gateway apparatus 600. The gateway apparatus 600 converts the image and audio data received from the server apparatus 700 on the basis of the communication band information [steps S1008a, S1020b, and S1016c].

(12) The gateway apparatus 600 delivers the image and audio data having undergone the conversion, and the user terminal 800 changes the image display and the audio output [steps S1022b and S1018c].

(13) If the image and the audio output from the user terminal 800 represent an expected article, the user performs an operation for terminating the two-way operations on the user terminal 800. If the image and the audio represent an article different from the expected article, the user requests introduction of another article by using the user terminal 800, and thereby operation data indicating that searching is to be performed again is transmitted. The processing is subsequently performed from steps S1016b and S1014c [step S1020c].

The processing will be described in detail.

In step S1002a, the server apparatus 700 delivers the image and audio data to the gateway apparatus 600 (Data Send).

In step S1002b, the gateway apparatus 600 receives the image and audio data from the server apparatus 700.

In step S1004b, the gateway apparatus 600 performs the beamforming (WiGig PCP/AP and Beacon).

In step S1002c, the user terminal 800 performs the beamforming (WiGig Station).

In step S1006b, the gateway apparatus 600 performs the WiGig connection processing (Response).

In step S1004c, the user terminal 800 performs the WiGig connection processing (Request).

In step S1006c, the user terminal 800 transmits the image and audio parameter change request to the gateway apparatus 600 (Request).

In step S1008b, the gateway apparatus 600 receives the image and audio parameter change request from the user terminal 800 (Response).

In step S1008c, the user terminal 800 notifies the gateway apparatus 600 of the result of the communication band measurement (Data Send).

In step S1010b, the gateway apparatus 600 converts the image and audio data.

In step S1012b, the gateway apparatus 600 delivers the image and audio data to the user terminal 800 (Data Send).

In step S1010c, the user terminal 800 performs the image display and the audio output.

In step S1014b, the gateway apparatus 600 transmits the tag information regarding the image and audio data to the user terminal 800 (Data Send).

In step S1012c, the user terminal 800 extracts the image related to the tag information.

In step S1014c, the user terminal 800 transmits the operation data to the gateway apparatus 600 (Data Send).

In step S1016b, the gateway apparatus 600 receives the operation data from the user terminal 800.

In step S1018b, the gateway apparatus 600 transmits the operation data to the server apparatus 700 (Data Send).

In step S1004a, the server apparatus 700 receives the operation data from the gateway apparatus 600.

In step S1006a, the server apparatus 700 analyzes the operation data.

In step S1008a, the server apparatus 700 delivers the image and audio data to the gateway apparatus 600 (Data Send).

In step S1016c, the user terminal 800 notifies the gateway apparatus 600 of the result of the communication band measurement (Data Send).

In step S1020b, the gateway apparatus 600 converts the image and audio data.

In step S1022b, the gateway apparatus 600 delivers the image and audio data to the user terminal 800 [Data Send].

In step S1018c, the user terminal 800 performs the image display and the audio output.

In step S1020c, the user terminal 800 judges whether a user operation is performed. If a user operation is performed, the processing returns to step S1014c. In the other cases, the processing is terminated.

Figure 11:
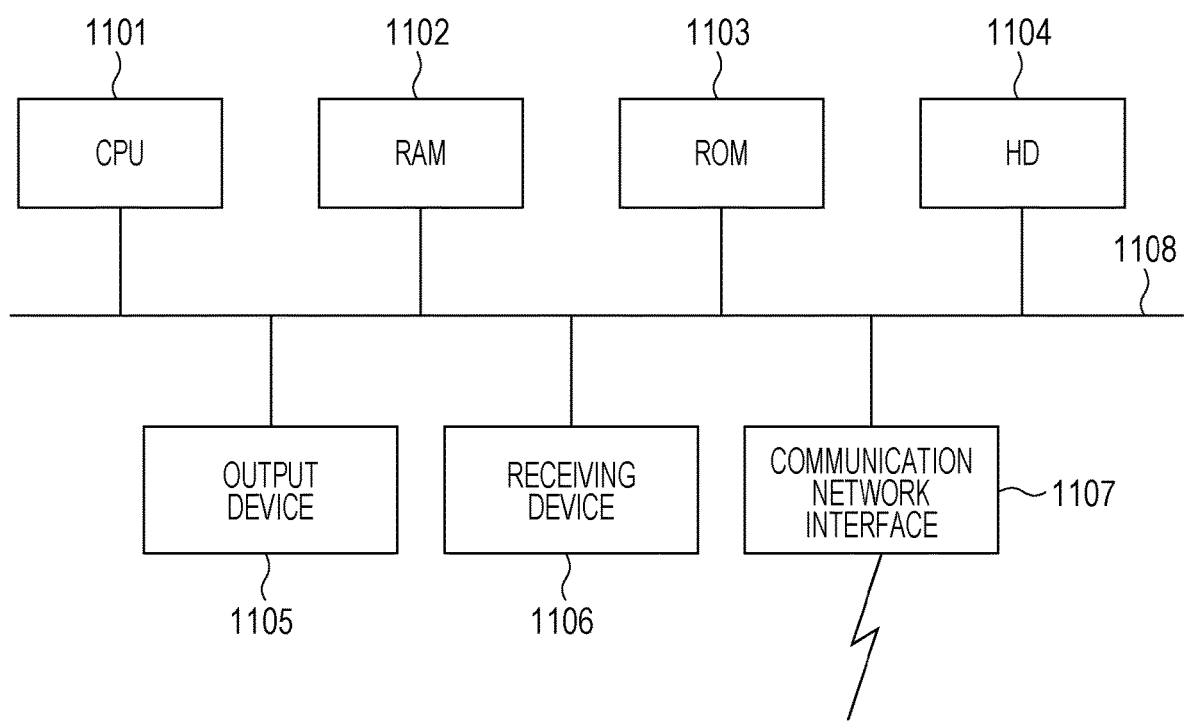
FIG. 11 is a block diagram illustrating an example hardware configuration of a computer by which these exemplary embodiments are implemented.

Note that a computer that runs programs for the exemplary embodiments (the digital signage apparatus 100, the server apparatus 200, the user terminal 300, the gateway apparatus 600, the server apparatus 700, and the user terminal 800) has a hardware configuration of a general computer, specifically, a personal computer, a computer able to serve as a server, or another computer, as illustrated in FIG. 11. In a specific example, a CPU 1101 is used as a processing unit (arithmetic section), and a RAM 1102, a read-only memory (ROM) 1103, and a hard disk (HD) 1104 are used as memory devices. As the HD 1104, for example, a hard disk or a solid state drive (SSD) may be used. The computer includes the CPU 1101, the RAM 1102, the ROM 1103, the HD 1104, a receiving device 1106, an output device 1105, a communication network interface 1107, and a bus 1108. The CPU 1101 runs the program for the wired-communication control module 105, the wireless-communication control module 125, the image-and-audio-data processing module 135, the monitoring-function control module 155, the wired-communication control module 205, the image-and-audio-data processing module 230, the wired-communication control module 605, the wireless-communication control module 625, the image-and-audio-data processing module 635, the wired-communication control module 705, the image-and-audio-data processing module 730, the wireless-communication control module 810, the image-and-audio-data processing module 830, the monitoring-function control module 850, and other modules.

The RAM 1102 stores therein the program and data.

The ROM 1103 stores therein a program and the like for starting the computer.

The HD 1104 is an auxiliary memory (may be a flash memory or another memory) and has functions of the server-receive-data memory module 115, the server-transmit-data memory module 120, the user-data memory module 130, the server-transmit-data memory module 210, the server-receive-data memory module 215, the server-receive-data memory module 615, the server-transmit-data memory module 620, the user-data memory module 630, the server-transmit-data memory module 710, the server-receive-data memory module 715, the user-data memory module 720, the image-and-audio-data memory module 725, the transmit-data memory module 815, the receive-data memory module 820, and the user-data memory module 825.

The receiving device 1106 has the functions of the touch-panel operation module 150, the touch-panel operation module 845, and other modules and receives data on the basis of a user operation (including an action, voice, a line of sight, and the like) performed on a keyboard, a mouse, a touch screen, a microphone, or a camera (including a line-of-sight detection camera and the like).

The output device 1105 such as a CRT, a liquid crystal display, a speaker, or another device has the functions of the image display module 140, the audio output module 145, the image display module 835, the audio output module 840, and other modules.

The communication network interface 1107 for connecting to a communication network, such as a network interface card, has the functions of the wired-communication control module 105, the antenna 110, the wired-communication control module 205, the wired-communication control module 605, the antenna 610, the wired-communication control module 705, and other modules. The bus 1108 connects these components to exchange data. Multiple computers as describe above may be connected to each other via a network.

An exemplary embodiment to be implemented by a computer program among the exemplary embodiments described above is implemented in the following manner. Specifically, a system in the hardware configuration reads a computer program that is software, and the software and the hardware resources cooperate with each other.

The hardware configuration in FIG. 11 illustrates an example configuration, and the configuration of each exemplary embodiment is not limited to the configuration illustrated in FIG. 11. Any configuration may be employed as long as the configuration enables the modules described with reference to the exemplary embodiment to be run. For example, at least one of the modules may be configured to run on dedicated hardware (such as an application specific integrated circuit (ASIC)). At least one of the modules may be in an external system and be connected to the other modules via a communication network. Further, multiple systems each serving as the system illustrated in FIG. 11 may be mutually connected via a communication network to operate in cooperation with each other. In particular, the configuration may be incorporated in a mobile telecommunication device (including a mobile phone, a smartphone, a mobile device, a wearable computer, and other devices), a personal digital electronics, a robot, a copier, a fax machine, a scanner, a printer, a multifunction printer (an information processing apparatus having two or more functions of a scanner, a printer, a copier, a fax machine, and other devices), or the like, aside from a personal computer.

Note that the program described above may be provided by using a recording medium having the program recorded therein and may be provided by using a communication unit. In this case, for example, the program described above may be regarded as an exemplary embodiment of the invention of a "non-transitory computer readable medium having a program recorded therein".

The "non-transitory computer readable medium having a program recorded therein" refers to a computer readable recording medium having a program recorded therein that is used for installation, execution, distribution, and the like of a program.

Examples of the recording medium include: a digital versatile disk (DVD) supporting "DVD-R, DVD-RW, DVD-RAM, and the like" that are standards designated by the DVD Forum and "DVD+R, DVD+RW, and the like" that are standards designated in accordance with "DVD+RW; a compact disc (CD) such as a CD-ROM, a CD recordable (CD-R), or a CD rewritable (CD-RW); a Blu-ray (registered trademark) disc; a magneto-optical disk (MO); a flexible disk (FD); a magnetic tape; a hard disk; a ROM; an electrically erasable and programmable ROM (EEPROM (registered trademark)); a flash memory; a RAM; and a secure digital (SD) memory card.

Part or the entirety of the aforementioned program may also be saved on the recording medium to be stored or distributed. The program or part thereof may be transmitted through communication by using a transmission medium such as a wired network used for a local area network (LAN), a metropolitan area network (MAN), a wide area network (WAN), the Internet, an intranet, an extranet, or the like; a wireless communication network; or a combination of these. Alternatively, the program or part thereof may be transmitted by using carrier signals.

Further, the program may be part or the entirety of another program or may be saved on a recording medium together with a different program. The program may also be divided to be saved on multiple recording media. The program may be saved in any manner such as by being compressed or encrypted, as long as the program is restorable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing server comprising:
a communication interface; and
a processor configured to:
   transmit, via the communication interface, advertisement information to an apparatus configured to display an advertisement, the advertisement information including information on at least one article;
   receive information regarding a communication band for communication between the information processing server and the apparatus, from the apparatus;
   in response to receiving the information regarding the communication band, perform conversion on the advertisement information in which a resolution of the advertisement information is changed, and transmit the converted advertisement information to the apparatus;
   receive, via the communication interface, operation information from the apparatus, the operation information identifying the at least one article;
   analyze the operation information and update the advertisement information, based on the operation information;
   perform conversion on the updated advertisement information after the receipt of the operation information, the conversion leading to a reduction of an amount of the updated advertisement information; and
   transmit, via the communication interface to the apparatus, the updated advertisement information having undergone the conversion performed by the processor,
wherein the information processing server and the apparatus are separate devices, the information processing server and the apparatus communicate over a network, and the information processing server does not display the advertisement.

2. The information processing server according to claim 1,
wherein the apparatus is configured to perform wireless communication with a user terminal, and
wherein the operation information received by the processor is operation information received by the apparatus from the user terminal.

3. The information processing server according to claim 1,
wherein the apparatus is a user terminal,
wherein the information processing server is configured to perform wireless communication with the user terminal, and
wherein the operation information received by the processor is operation information received from the user terminal.

4. The information processing server according to claim 2,
wherein IEEE 802.11ad is used for the wireless communication.

5. The information processing server according to claim 3,
wherein IEEE 802.11ad is used for the wireless communication.

6. A non-transitory computer readable medium storing a program causing an information processing server to execute a process for information processing, the process comprising:
transmitting, via a communication interface, advertisement information to an apparatus provided for presenting an advertisement, the advertisement information including information on at least one article;
receiving information regarding a communication band for communication between the information processing server and the apparatus, from the apparatus;
in response to receiving the information regarding the communication band, performing conversion on the advertisement information in which a resolution of the advertisement information is changed, and transmitting the converted advertisement information to the apparatus;
receiving, via the communication interface, operation information from the apparatus, the operation information identifying the at least one article; and
analyzing the operation information and updating the advertisement information, based on the operation information;
performing conversion on the updated advertisement information after the receipt of the operation information, the conversion leading to a reduction of an amount of the updated advertisement information; and
transmitting, via the communication interface to the apparatus, the updated advertisement information having undergone the conversion,
wherein the information processing server and the apparatus are separate devices, the information processing server and the apparatus communicate over a network, and the information processing server does not display the advertisement.

7. An information processing server comprising:
transmitting means for transmitting advertisement information to an apparatus provided for presenting an advertisement, the advertisement information including information on at least one article;
receiving means for receiving information regarding a communication band for communication between the information processing server and the apparatus, from the apparatus; and
converting means for, in response to receiving the information regarding the communication band, performing conversion on the advertisement information in which a resolution of the advertisement information is changed, wherein:

the receiving means receives operation information from the apparatus, the operation information identifying the at least one article;

the information processing server further comprises analyzing means for analyzing the operation information and updating the advertisement information, based on the operation information; and the converting means performs conversion on the updated advertisement information after the receiving means receives the operation information, the conversion leading to a reduction of an amount of the updated advertisement information, the transmitting means transmits, to the apparatus, the updated advertisement information having undergone the conversion performed by the converting means, and the information processing server and the apparatus are separate devices, the information processing server and the apparatus communicate over a network, and the information processing server does not display the advertisement.

* * * * *